United States Patent
Deguchi et al.

(10) Patent No.: US 11,675,523 B2
(45) Date of Patent: Jun. 13, 2023

(54) REMOTE COPY OF COMPRESSED JOURNAL DATA AND CORRESPONDING METADATA

(71) Applicant: Hitachi, Ltd., Tokyo (JP)

(72) Inventors: Akira Deguchi, Tokyo (JP); Nobuhiro Yokoi, Tokyo (JP); Hiroka Ihara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/471,575

(22) Filed: Sep. 10, 2021

(65) Prior Publication Data

US 2022/0276785 A1  Sep. 1, 2022

(30) Foreign Application Priority Data

Mar. 1, 2021 (JP) .............................. JP2021-031882

(51) Int. Cl.
*G06F 3/06* (2006.01)

(52) U.S. Cl.
CPC .............. *G06F 3/065* (2013.01); *G06F 3/061* (2013.01); *G06F 3/0683* (2013.01)

(58) Field of Classification Search
CPC ......... G06F 3/065; G06F 3/061; G06F 3/0683
See application file for complete search history.

(56) References Cited

U.S. PATENT DOCUMENTS

| 8,849,772 | B1* | 9/2014 | Huang ................ G06F 11/1451 707/693 |
| 10,235,064 | B1* | 3/2019 | Natanzon .............. G06F 3/0637 |
| 2007/0168362 | A1* | 7/2007 | Hirakawa ........... G06F 11/2082 |
| 2013/0151770 | A1 | 6/2013 | Hara |
| 2014/0250271 | A1 | 9/2014 | Hara |
| 2015/0370827 | A1* | 12/2015 | Parkison ............... G06F 16/178 707/610 |

FOREIGN PATENT DOCUMENTS

JP          2014-524601 A    9/2014

* cited by examiner

*Primary Examiner* — Chie Yew
(74) *Attorney, Agent, or Firm* — Procopio, Cory, Hargreaves & Savitch LLP

(57) ABSTRACT

A primary storage system reads a plurality of journal data, and performs collective compression that is compression of data that is at least a part of the plurality of pieces of journal data in the plurality of journals and is larger than a size of one journal data. The collectively compressed data, which is a plurality of pieces of journal data subjected to collective compression, is a transfer target from the primary storage system to the secondary storage system. The journal is journal data and metadata including a write order of the journal data and associated with the journal data. The journal data is a copy of data written in the primary volume. The secondary storage system acquires a plurality of pieces of journal data by decompressing one or more pieces of collectively compressed data, and writes the plurality of pieces of journal data to the secondary volume.

17 Claims, 18 Drawing Sheets

FIG. 7

| COPY SOURCE ID | COPY DESTINATION ID | DISTANCE | BAND |
|---|---|---|---|
| A | B | 1300km | 10Gbps |
| ... | ... | ... | ... |

FIG. 8

| COPY SOURCE ID | COPY DESTINATION ID | REQUIRED MULTIPLICITY |
|---|---|---|
| A | B | 8 MULTIPLICITIES |
| A | C | 12 MULTIPLICITIES |
| ... | ... | ... |

FIG. 22

|  | METHOD 1 | METHOD 2 | METHOD 3 | THIRD EMBODIMENT |
|---|---|---|---|---|
| SEQ# 2240 | ✔ | ✔ | ✔ | ✔ |
| PVOL ADDRESS 2241 | ✔ | ✔ | ✔ | ✔ |
| JNL DATA SIZE 2242 | ✔ | ✔ | ✔ | ✔ |
| JVOL STORAGE START ADDRESS 2243 | ✔ | ✔ | ✔ | ✔ |
| COMPRESSION BIT 2244 | ✔ | ✔ | ✔ | ✔ |
| COMPRESSED SIZE 2245 | ✔ | ✔ | ✔ | ✔ |
| DIVISION BIT 2246 |  |  | ✔ |  |
| DIVIDED DATA SIZE 2247 |  |  | ✔ |  |
| COMPRESSION START SEQ# 2248 |  |  | ✔ | ✔ (NOT ESSENTIAL) |
| START OFFSET 2249 |  |  |  | ✔ (NOT ESSENTIAL) |
| COMPRESSION END SEQ# 2250 |  |  | ✔ | ✔ (NOT ESSENTIAL) |
| END OFFSET 2251 |  |  |  | ✔ (NOT ESSENTIAL) |

US 11,675,523 B2

REMOTE COPY OF COMPRESSED JOURNAL DATA AND CORRESPONDING METADATA

BACKGROUND OF THE INVENTION

1. Field of the Invention

The present invention generally relates to remote copy of data from a primary storage system to a secondary storage system.

2. Description of the Related Art

A technique related to remote copy of data from a primary storage system to a secondary storage system is known. The amount of data transferred between the storage systems for remote copy is preferably small. As an example, this is because it is possible to contribute to resource reduction based on a communication band between the storage systems.

According to the technique disclosed in JP 2014-524601 T, data to be transferred is compressed data. Specifically, the primary storage system compresses and stores data to be written, and transfers the stored compressed data to the secondary storage system without decompression.

SUMMARY OF THE INVENTION

According to the technology disclosed in JP 2014-524601 T, both the unit to be compressed and the unit to be transferred in the primary storage system are write units. Therefore, it is expected that the recovery point objective (RPO) is short, but the reduction effect (compression effect) of the transfer target data is not necessarily high.

As the remote copy in which the amount of data to be transferred is reduced, there is differential remote copy. Specifically, the primary storage system periodically transfers only differential data with the secondary storage system to the secondary storage system. Even if data is written to the primary storage system a plurality of times in a predetermined cycle, the data to be transferred may be only the data written last as long as the size of the written data is the same as the write destination. Therefore, it is expected that the reduction effect of the data to be transferred is high (a reduction rate which is the ratio of the total capacity of the data transferred to the secondary storage to the total capacity of the data written in the primary storage system is small), but there is a concern that the RPO will deteriorate because it depends on the data transfer cycle. It is also possible to periodically acquire a snapshot in the primary storage and transfer differential data between snapshots as differential data between the primary storage system and the secondary storage system.

A primary storage system having a volume and a secondary storage system having a secondary volume forming a volume pair with the primary volume are provided. The primary storage system performs collective compression that is compression of data that is at least a part of a plurality of pieces of journal data in a plurality of journals and is larger than a size of one journal data. Collectively compressed data that is data compressed collectively is a transfer target from the primary storage system to the secondary storage system. The journal includes journal data and metadata including a write order of the journal data. The journal data is a copy of data written in the primary volume. The secondary storage system acquires a plurality of pieces of journal data by expanding one or more pieces of collectively compressed data, and writes the plurality of pieces of journal data to the secondary volume according to the write order indicated by each of the plurality of pieces of metadata.

According to the present invention, both maintenance of a short RPO and improvement of a reduction effect of transfer target data can be realized.

BRIEF DESCRIPTION OF THE DRAWINGS

FIG. 7 illustrates a configuration example of a distance table;

FIG. 8 illustrates a configuration example of a required multiplicity table;

FIG. 22 illustrates a relationship between a case and information in the JNCB.

DESCRIPTION OF THE PREFERRED EMBODIMENTS

Figure 1:
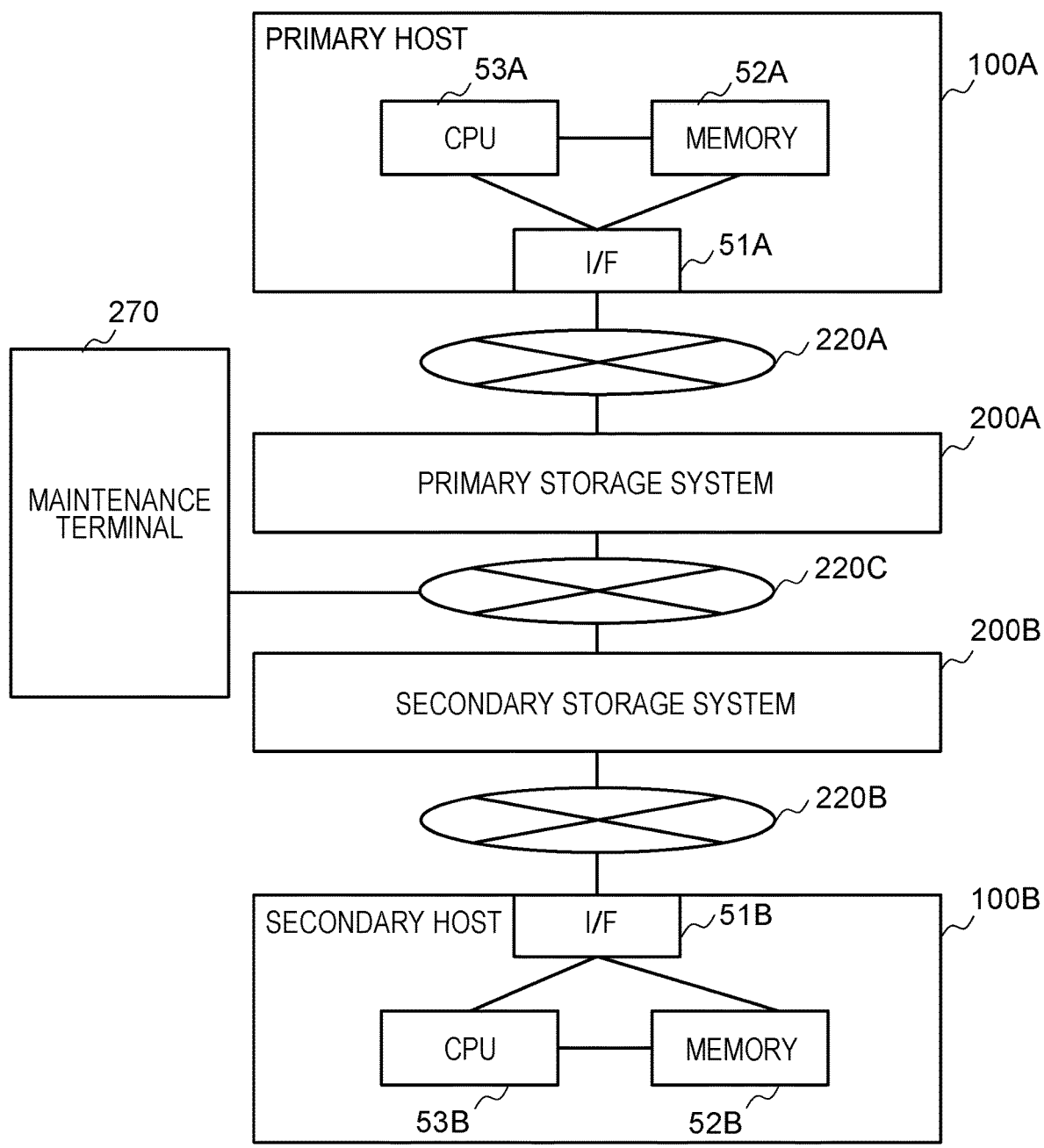
FIG. 1 illustrates a configuration example of an entire system according to a first embodiment.

In the following description, an "interface device" may represent one or more interface devices. The one or more interface devices may be at least one of the following.

One or more input/output (I/O) interface devices. An input/output (I/O) interface device is an interface device for at least one of the I/O device and a remote display computer. The I/O interface device for the display computer may be a communication interface device. The at least one I/O device may be any of a user interface device, for example, an input device such as a keyboard and a pointing device, and an output device such as a display device.

One or more communication interface devices. The one or more interface devices may be one or more communication interface devices of the same type (for example, one or more NICs (Network Interface Card)), or may be two or more communication interface devices of different types (for example, NIC and HBA (Host Bus Adapter)).

Further, in the following description, a "memory" is one or more memory devices that are examples of one or more storage devices, and may typically be a main memory device. At least one memory device in the memory may be a volatile memory device or a non-volatile memory device.

Further, in the following description, a "persistent storage device" may be one or more persistent storage devices that are examples of one or more storage devices. The persistent storage device may typically be a non-volatile storage device (for example, auxiliary storage device), and specifically, for example, an HDD (Hard Disk Drive), an SSD (Solid State Drive), an NVNE (Non-Volatile Memory Express) drive or an SCM (Storage Class Memory) may be used.

Further, in the following description, a "storage device" may be a memory or at least the memory of the persistent storage device.

Further, in the following description, a "processor" may be one or more processor devices. At least one processor device is typically a microprocessor device such as a CPU (Central Processing Unit), or may be other types of processor devices such as a GPU (Graphics Processing Unit). At least one processor device may be configured by a single core, or multiple cores. At least one processor device may be a processor core. At least one processor device may be a processor device such as a hardware circuit (for example, FPGA (Field-Programmable Gate Array), CPLD (Complex Programmable Logic Device), or an ASIC (Application Specific Integrated Circuit)) which performs some or all of the processes in a broad sense.

In addition, in the following description, the information that can be output for an input may be described in terms of expressions such as "xxx table". The information may be any structured data (for example, structured data or unstructured data), or may be a learning model represented by a neural network that generates an output to an input, a genetic algorithm, or a random forest. Therefore, the "xxx table" can be called "xxx information". In addition, in the following description, the configuration of each table is given as merely exemplary. One table may be divided into two or more tables, or all or some of two or more tables may be configured by one table.

In addition, in the following description, a process may be described using the word "program" as a subject. The program is performed by a processor, and a designated process is performed appropriately using a storage device and/or an interface device. Therefore, the subject of the process may be the processor (or a device or system which includes the processor). The program may be installed on a device such as a computer from a program source. The program source may be, for example, a program distribution server or a computer-readable recording medium (for example, a non-transitory recording medium). In addition, in the following description, two or more programs may be expressed as one program, or one program may be expressed as two or more programs.

A "volume" (VOL) is a logical storage area. The volume may be a real volume (RVOL) or a virtual volume (VVOL). The "RVOL" may be a VOL based on the storage device, and the "VVOL" may be a volume according to a capacity virtualization technology (typically, thin provisioning).

In addition, the "storage system" may be a system including a plurality of storage devices and a controller that performs data I/O with respect to the plurality of storage devices, or may be a system including one or more physical computers. In the latter system, for example, each of the one or more physical computers may execute predetermined software to construct the one or more physical computers as software-defined anything (SDx). Examples of the SDx may include an SDS (Software Defined Storage) or an SDDC (Software-defined Datacenter).

Further, in the following description, in a case where the same type of elements is referred without distinction, a common symbol of the reference symbols may be used. In a case where the same type of elements is referred in distinction, the reference numeral may be used.

First Embodiment

FIG. 1 illustrates a configuration example of an entire system according to a first embodiment.

A primary host 100A is connected to a primary storage system 200A via a network 220A (for example, a front-end network). A secondary host 100B is connected to a secondary storage system 200B via a network 220B (for example, a front-end network). The primary storage system 200A and the secondary storage system 200B are connected via a network 220C (for example, a back-end network). Two or more of the networks 220A to 220C may be common, or at least one of the networks 220A to 220C may be a dedicated line.

A primary site (a site including the primary host 100A and the primary storage system 200A) and a secondary site (a site including the secondary host 100B and the secondary storage system 200B) may be geographically separated. The primary host 100A is a computer including an interface device 51A, a memory 52A, and a central processing unit (CPU) 53A. The secondary host 100B is a computer including an interface device 51B, a memory 52B, and a CPU 53B. Note that the primary host 100A may be a virtual device (for example, a virtual machine (VM) or a container). Similarly, the secondary host 100B may be a virtual device. In addition, the primary host 100A may be a virtual device and provided in the primary storage system 200A, and similarly, the secondary host 100B may be a virtual device and provided in the secondary storage system 200B (that is, at least one of the storage systems 200A and 200B may be a so-called hyper-converged storage system). In addition, the secondary host 100B may not be provided. In addition, for example, when the distance between the storage systems 200A and 200B is short, the primary host 100A may be connected to the secondary storage system 200B in addition to the primary storage system 200A. The secondary host 100B may be connected to the primary storage system 200A in addition to the secondary storage system 200B. Both or one of the storage systems 200A and 200B may be a system installed at co-location or a system on a cloud that provides a cloud computing service (storage service).

The primary host 100A executes software (for example, a database management system (DBMS)) for executing business processing and transmits a data write request to the primary storage system 200A. The primary storage system 200A stores data according to the write request. Remote copy is performed between the storage systems 200A and 200B. That is, the secondary storage system 200B receives data from the primary storage system 200A and stores the received data. When there is a failure in the primary host 100A or the primary storage system 200A, disaster recovery is performed. As a result, the secondary host 100B can continue the business processing of the primary host 100A using the data in the secondary storage system 200B. Note that the remote copy system is a system including the storage systems 200A and 200B.

There is a maintenance terminal 270 connected to the network 220C. The maintenance terminal 270 communicates with at least one of the storage systems 200A and 200B for maintenance or management of the storage system 200. The maintenance terminal 270 may be connected to the network 220A to maintain the primary storage system 200A. In addition, another maintenance terminal 270 may be connected to the network 220B to maintain the storage system 200B.

Figure 2:
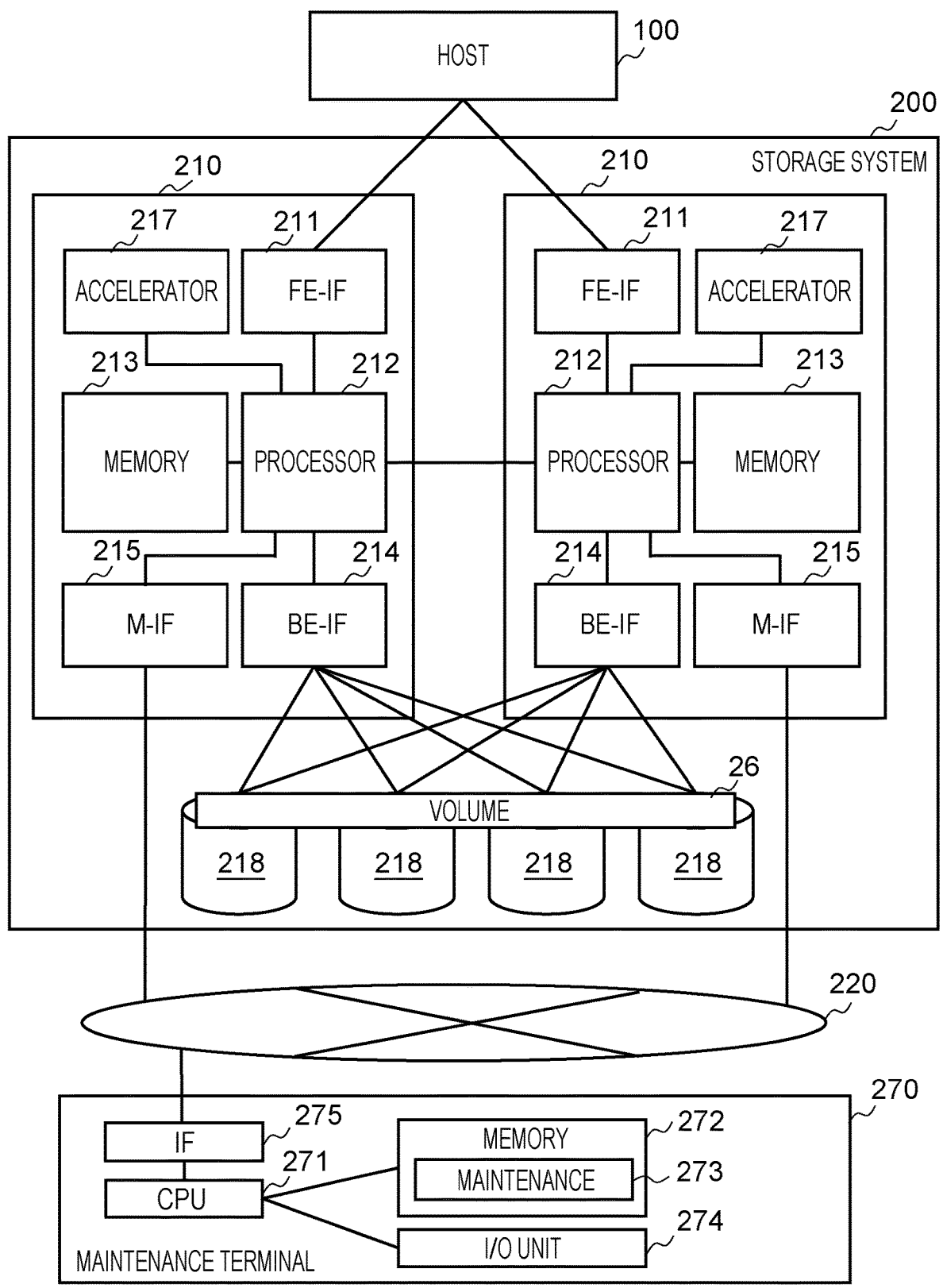
FIG. 2 illustrates a configuration example of a storage system and a maintenance terminal.

FIG. 2 illustrates a configuration example of the storage system 200 and the maintenance terminal 270.

The storage system 200 includes a drive group (a plurality of drives 218) and a redundant controller 210 that performs data I/O with respect to the drive group. The drive 218 is an example of a persistent storage device. The drive group may configure one or more RAID (Redundant Array of Independent (or Inexpensive) Disks) groups. A volume 26 is provided on the basis of the drive group.

The controller 210 includes a front-end interface (FE-IF) 211, a back-end interface (BE-IF) 214, a management interface (M-IF) 215, an accelerator 217, a memory 213, and a processor 212 connected thereto. The IFs 211, 214, and 215 are examples of the interface device.

The FE-IF 211 is an interface device that communicates with the host 100. The FE-IF 211 may have a plurality of ports (for example, Fibre Channel port, iSCSI port). The path of remote copy (the path through which the data to be transferred passes) may be a path including the port of the FE-IF 211 of the primary storage system 200A and the port of the FE-IF 211 of the secondary storage system 200B. An interface device for remote copy may be provided separately from the FE-IF 211.

The BE-IF 214 is an interface device that communicates with each drive 218.

The M-IF 215 is an interface device that communicates with the maintenance terminal 270. The port of the M-IF 215 may be included in the path of remote copy instead of the port of the FE-IF 211.

The memory 213 stores programs and data. The memory 213 may have, for example, a cache memory area in which data is temporarily stored. The processor 212 executes the program stored in the memory 213. The accelerator 217 is a hardware circuit (for example, FPGA or ASIC) that executes a part of the processing of the processor 212 (for example, compression or expansion of data). The accelerator 217 may be a part of a processor in a broad sense including the processor 212. The present invention can be implemented without the accelerator 217.

The maintenance terminal 270 is a computer including an IF 275, an I/O unit 274, a memory 272, and a CPU 271 connected thereto. The IF 275 is an interface device having a port connected to the network 220. The I/O unit 274 is a user interface device such as a keyboard, a pointing device, and a display device. The memory 272 stores a program (for example, a maintenance program 273) and data. The CPU 271 performs maintenance of the storage system 200 by executing the maintenance program 273. For example, the CPU 271 that executes the maintenance program 273 may receive information (for example, information indicating a distance between the storage systems 200A and 200B or information indicating a required multiplicity to be described later) from the user via the I/O unit 274 and set the received information in the storage system 200 via the IF 275.

Figure 3:
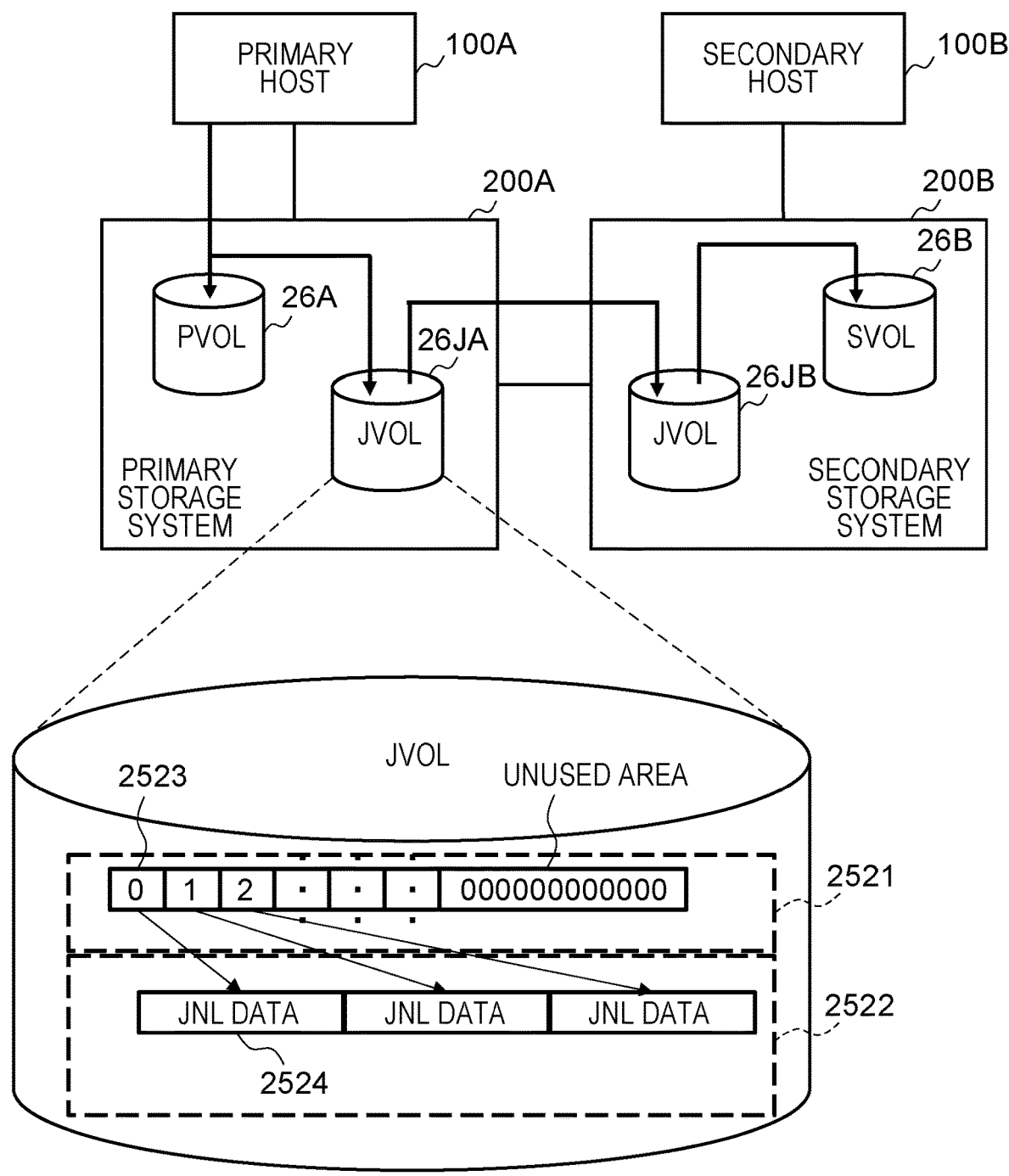
FIG. 3 illustrates an example of an outline of remote copy from a primary storage system to a secondary storage system.

FIG. 3 illustrates an example of an outline of remote copy from the primary storage system 200A to the secondary storage system 200B.

The remote copy according to the present embodiment is asynchronous remote copy that is performed asynchronously (the write request is completed even if the write target data accompanying the write request is not copied to a SVOL 26B) with the processing according to the write request specifying a PVOL 26A. In the asynchronous remote copy, JNL (journal) described later is used.

The primary storage system 200A includes the primary volume (PVOL) 26A and a volume 26 such as a journal volume (JVOL) 26JA in which data stored in the PVOL 26A is stored as JNL data. The secondary storage system 200B includes a JVOL 26JB that is a transfer destination of JNL stored in the JVOL 26JA, and a volume 26 such as a secondary volume (SVOL) 26B that stores JNL data in the JNL stored in the JVOL 26JB.

A VOL pair is constituted by the PVOL 26A and the SVOL 26B. Remote copy of the data stored in the PVOL 26A to the SVOL 26B is realized via the JVOLs 26JA and 26JB. Any volume 26 may be based on the drive group, but at least a part of the JVOL 26J may be based on the memory 213 (for example, the cache memory area) in the controller 210. In at least one of the storage systems 200A and 200B, one JVOL 26J may exist for a plurality of VOL pairs. Further, a plurality of JVOLs 26J may exist for one VOL pair. In addition, the number of JVOLs 26J may be different for one VOL pair between the storage systems 200A and 200B.

The JNL includes JNL data 2524 and a JNCB (Journal Control Block) 2523.

The JNL data 2524 is the same data as the write target data written in the PVOL 26A (duplication of the write target data).

The JNCB 2523 is an example of metadata of the JNL data 2524. Specifically, for example, the JNCB 2523 includes information such as an address (for example, a logical block address (LBA)) of a storage destination of the JNL data 2524, an address (address in the PVOL 26A) of a storage destination of the original write target data of the JNL data 2524, an ID (and/or the ID of the SVOL constituting the VOL pair with the PVOL) of the PVOL in which the original write target data is stored, and a sequence number (order of write requests accompanied by the original write target data). The sequence number (SEQ #) is an example of the write order. Another example of the write order may be a time stamp.

The JVOL 26J includes a JNCB area 2521 that is an area where the JNCB 2523 is stored and a JNL data area 2522 that is an area where the JNL data 2524 is stored. As illustrated in FIG. 3, the storage destination of the JNL data 2524 from the JNCB 2523 can be specified (see an arrow extending from the JNCB 2523 to the JNL data 2524). For example, in the JNCB area 2521, the JNCB 2523 is stored in the order of SEQ #.

The outline of remote copy is as follows, for example. That is, the primary storage system 200A stores the write target data accompanying the write request in the PVOL 26A according to the write request from the primary host 100A, stores the JNL including the JNL data as a copy of the write target data and the JNCB which is the metadata of the JNL data in the JVOL 26JA, and reports the write completion to the primary host 100A. In response to the JNL read request from the secondary storage system 200B (alternatively, spontaneously without the JNL read request), the primary storage system 200A transfers the JNL to be transferred to the secondary storage system 200B asynchronously with the processing performed in response to the write request. The secondary storage system 200B receives the JNL and stores the received JNL in the JVOL 26JB. The secondary storage system 200B stores the JNL data in the JNL in the SVOL 26B based on the JNCB in the JNL. As a result, data is remotely copied from the PVOL 26A of the primary storage system 200A to the SVOL 26B of the secondary storage system 200B.

In the following description, for convenience, "JNL data" is a countable noun. This is because the JNL data is a set of data included in "JNL" (journal) as a countable noun. For example, if there are N JNLs (N is an integer of 2 or more), the number of JNL data is N. In the present embodiment, in a case where the number of JNL to be transferred is N, N pieces of JNL data are compressed by the primary storage system 200A. Note that, since the JNL data is a countable noun, write target data that is original data of the JNL data can also be a countable noun. Further, hereinafter, compressing the N pieces of JNL data may be referred to as "collective compression".

Figure 4:
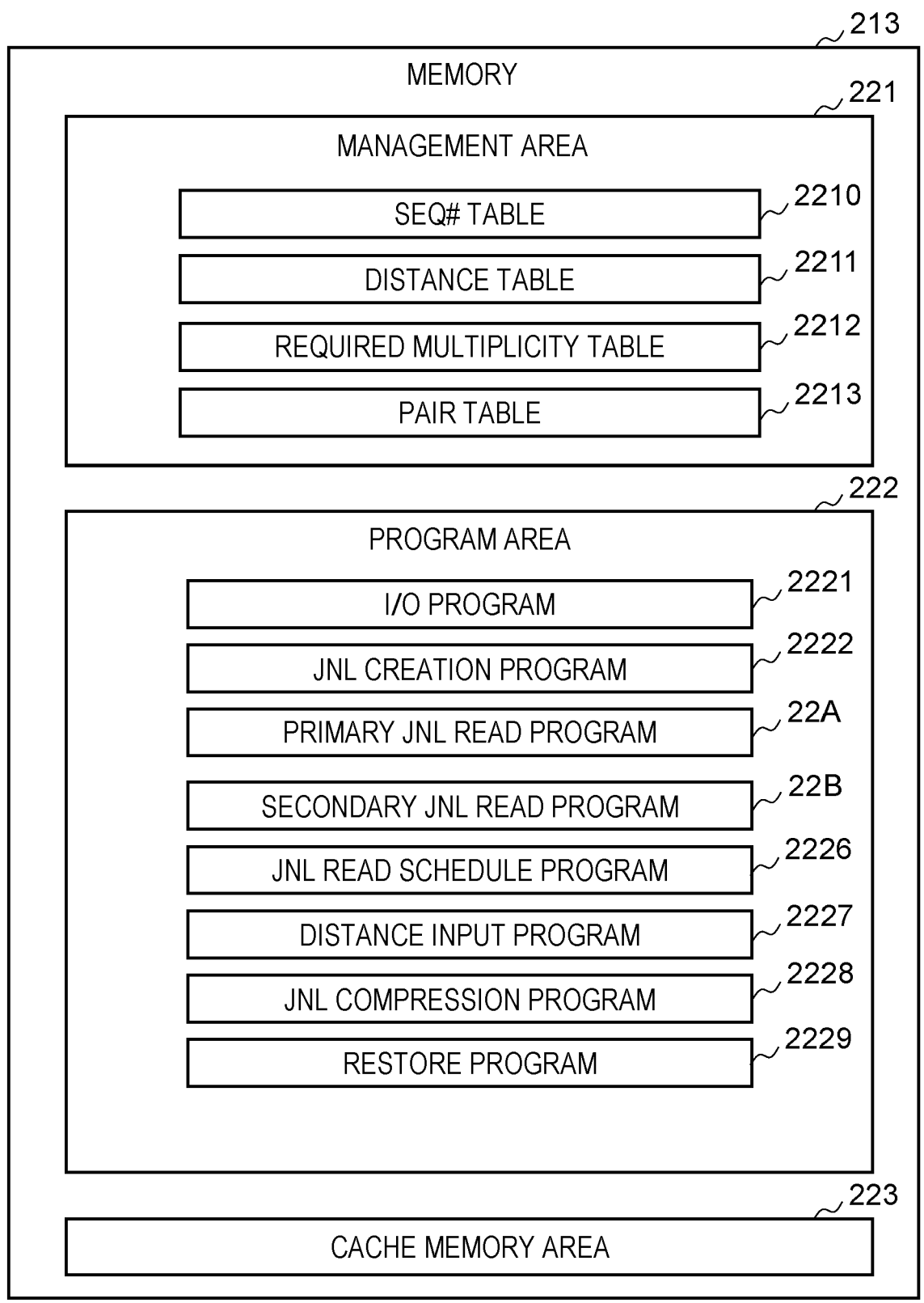
FIG. 4 illustrates a configuration example of a memory of the storage system.

FIG. 4 illustrates a configuration example of the memory 213.

The memory 213 includes a management area 221, a program area 222, and a cache memory area 223.

Management information is stored in the management area 221. The management information includes an SEQ #table 2210, a distance table 2211, a required multiplicity table 2212, and a pair table 2213. The information 2210 to 2212 will be described later. The pair table 2213 includes, for each VOL pair, the ID of the PVOL, the ID of the SVOL, and the ID of the storage system 200 that is the copy destination. In addition, the pair table 2213 may also manage a pair state for managing a temporary stop state, normal, abnormal, and the like of the copy process.

A program is stored in the program area 222. Examples of the program to be stored include an I/O program 2221 for performing I/O of data to the PVOL (or SVOL) in response to an I/O request from the host, a JNL creation program 2222 for creating JNL data, a primary JNL read program 22A for transferring JNL, a secondary JNL read program 22B for receiving the transferred JNL, a JNL read schedule program 2226 for determining a read schedule of the JNL data, a distance input program 2227 for inputting information indicating a distance between the storage systems 200A and 200B, a JNL compression program 2228 for compressing the JNL data, and a restore program 2229 for restoring data. Note that, in the present embodiment, there are methods 1 to 3 as described later as a remote copy method, and for the sake of simplicity of description, each of the primary JNL read program 22A and the secondary JNL read program 22B is common to methods 1 to 3, but a program dedicated to each of methods 1 to 3 may be prepared for each method.

Data is temporarily stored in the cache memory area 223.

The storage system 200 including the memory 213 can function as one or both of the primary storage system 200A and the secondary storage system 200B. For example, in a case where the storage system 200 includes the PVOL 26A but does not include the SVOL 26B, the storage system 200 functions as the primary storage system 200A. In a case where the storage system 200 does not have the PVOL 26A but has the SVOL 26B, the storage system 200 functions as the secondary storage system 200B. In a case where the storage system 200 has the SVOL 26B in a first VOL pair and has the PVOL 26A in a second VOL pair, the storage system 200 functions as both the primary storage system 200A and the secondary storage system 200B.

Figure 5:
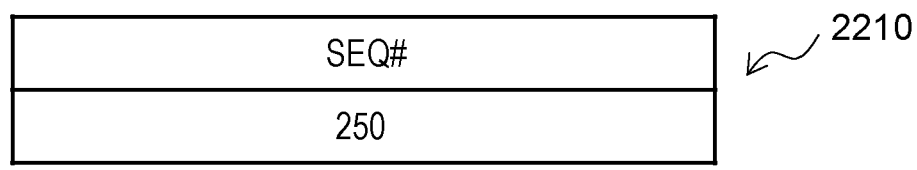
FIG. 5 illustrates a configuration example of an SEQ #table.

FIG. 5 illustrates a configuration example of the SEQ #table 2210.

For the copy source, the SEQ #table 2210 includes information indicating SEQ # of the latest JNL (JNL created latest). As a result, it is possible to specify the SEQ # to be included in the JNL to be created next. For example, SEQ # included in the JNL to be created next is the number (for example, a number incremented by one) next to SEQ # indicated by the current SEQ #table 2210. Note that, regarding the copy source, the SEQ #table 2210 may include information indicating SEQ # of the oldest JNL (JNL including the JNL data of the write target data having the oldest write reception time) among the JNLs not transferred to the copy destination. As a result, the JNL of the next transfer target can be specified.

On the other hand, for the copy destination, the SEQ #table 2210 includes information indicating the SEQ # of the JNL that is the oldest among the JNLs that are not reflected in the SVOL. As a result, it is possible to specify SEQ # included in JNL to be reflected next. Regarding the copy destination, the SEQ #table 2210 may include information indicating the SEQ # of the JNL that is the oldest among the JNLs that have not been received from the copy source. As a result, it is possible to specify JNL to be requested to the primary storage system 200A next.

Figure 6:
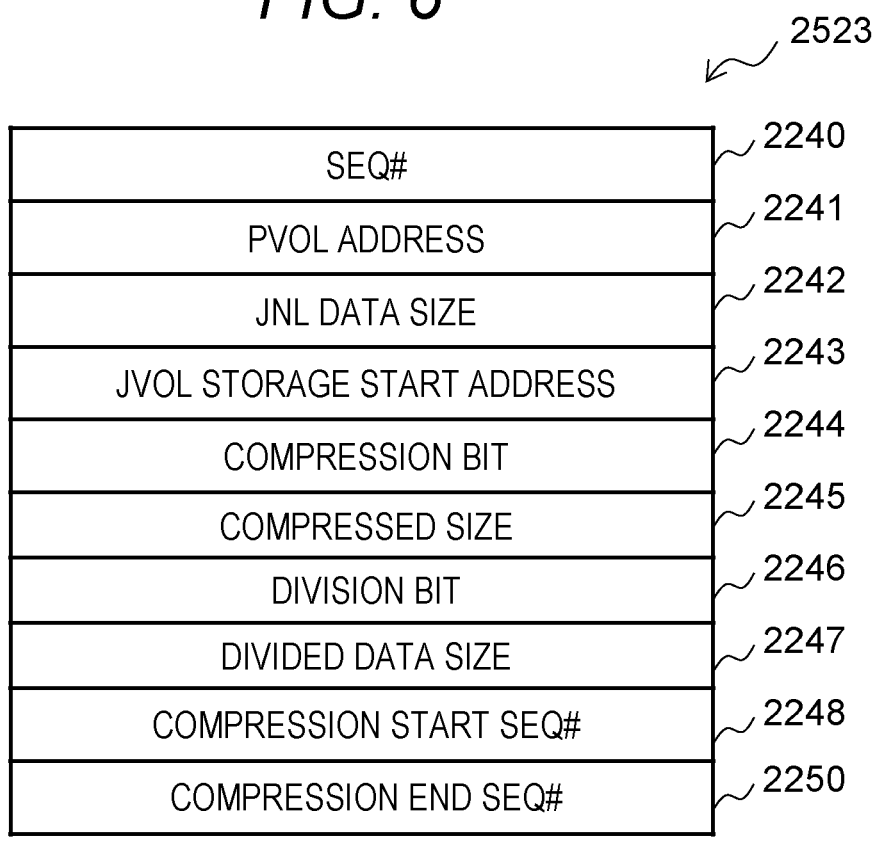
FIG. 6 illustrates a configuration example of JNCB.

FIG. 6 illustrates a configuration example of the JNCB 2523.

The JNCB 2523 is a JNCB having a configuration that can be used for any of methods 1 to 3 described later. In the present embodiment, any of methods 1 to 3 may be selectively adopted, but any of methods 1 to 3 may be fixedly adopted. In a case where any of methods 1 to 3 is fixedly adopted, there may be no partial information of the information 2240 to 2250 exemplified in FIG. 6.

The JNCB 2523 includes information such as a SEQ #2240, a PVOL address 2241, a JNL data size 2242, a JVOL storage start address 2243, a compression bit 2244, a compressed size 2245, a division bit 2246, a divided data size 2247, a compression start SEQ #2248, and a compression end SEQ #2250.

The SEQ #2240 represents SEQ # allocated to JNL managed by the JNCB 2523. The PVOL address 2241 indicates an address (for example, the ID of the PVOL 26A and the LBA of the region of the PVOL 26) of the PVOL 26A. The JNL data size 2242 represents the size of the JNL data 2524 in the same JNL as the JNCB 2523. The JVOL storage start address 2243 is an address of an area in the JVOL 26JA, and represents a start address of an area in which the JNL data 2524 is stored.

The compression bit 2244 indicates whether the JNL data 2524 stored in the JVOL 26JA is compressed. Note that, in a case where compression (single compression or collective compression of JNL data) is always executed, the compression bit 2244 may be omitted. Further, in a case where the primary storage system 200A and the secondary storage system 200B mutually recognize that compression is to be performed, it is not necessary to provide the compression bit 2244 in the JNCB 2242.

The compressed size 2245 is valid information in a case where the compression bit 2244 is "ON" (a value meaning compression), and represents the size of the JNL data after compression. In the case of collective compression, the compressed size 2245 represents the collective compression size that is the data size of the collectively compressed data (the N pieces of JNL data that have been collectively compressed). The compression bit 2244 "ON" and the same collectively compressed size may be stored in each of the N JNCBs corresponding to the collectively compressed N JNL data.

The information 2246 and 2247 is information in which the compression bit 2244 is "ON" and which is valid in method 3 described later (in other words, in a case where method 3 is not adopted, the information 2246 and 2247 may be omitted). The division bit 2246 indicates whether the collectively compressed data is divided into p (p is an integer of 2 or more) data segments (hereinafter, each data segment is referred to as a "compressed data segment"). The divided data size 2247 represents the size of the compressed data segment.

The information 2248 and 2250 is information in which the compression bit 2244 is "ON" and which is valid in method 3 described later (in other words, in a case where method 3 is not adopted, the information 2246 and 2247 may be omitted). Further, the information 2248 and 2250 can be utilized in the method described in the third embodiment. The compression start SEQ #2248 represents the oldest (first) SEQ # among the N SEQ # corresponding to the N pieces of JNL data that have been collectively compressed. The compression end SEQ #2250 represents the latest (last) SEQ # among the N SEQ # corresponding to the N pieces of JNL data that have been collectively compressed. That is, the information 2248 and 2250 is information indicating which SEQ # data is collectively compressed. By using the information 2248 and 2250, it is possible to grasp which JNL needs to be collectively processed when decompressing compressed data or the like. Note that the relationship between the case and the information in the JNCB 2523 is illustrated in FIG. 22. In each case (method or embodiment), information associated with a check mark is essential. In the third embodiment, the JNCB 2523 may include information such as a start offset 2249 and an end offset 2251. However, as illustrated in FIG. 22, the information 2248 to 2251 may not be provided in the third embodiment.

FIG. 7 illustrates a configuration example of the distance table 2211.

The distance table 2211 holds information such as a copy source ID 22111, a copy destination ID 22112, a distance 22113, and a band 22114 for each pair of the primary and secondary storage systems 200A and 200B.

The copy source ID 22111 represents an ID of the primary storage system 200A. The copy destination ID 22112 represents an ID of the secondary storage system 200B. The distance 22113 represents a geographical distance between the primary and secondary storage systems 200A and 200B. The band 22114 represents a data transfer band between the primary storage systems 200A and 200B. This value is information for calculating the required multiplicity of the data transfer processing between the primary storage system 200A and the secondary storage system 200B. Therefore, a round-trip communication time between the primary storage system 200A and the secondary storage system 200B can also be substituted. In addition, this table is unnecessary as long as the distance and the response time can be determined as the required multiplicity of FIG. 8 described later.

FIG. 8 illustrates a configuration example of the required multiplicity table 2212.

The required multiplicity table 2212 holds information such as a copy source ID 22121, a copy destination ID 22122, and a required multiplicity 22123 for each pair of the primary and secondary storage systems 200A and 200B.

The copy source ID 22121 represents an ID of the primary storage system 200A. The copy destination ID 22122 represents an ID of the secondary storage system 200B. The required multiplicity 22123 represents the multiplicity of data transfer processing required between the primary and secondary storage systems 200A and 200B.

Figure 9:
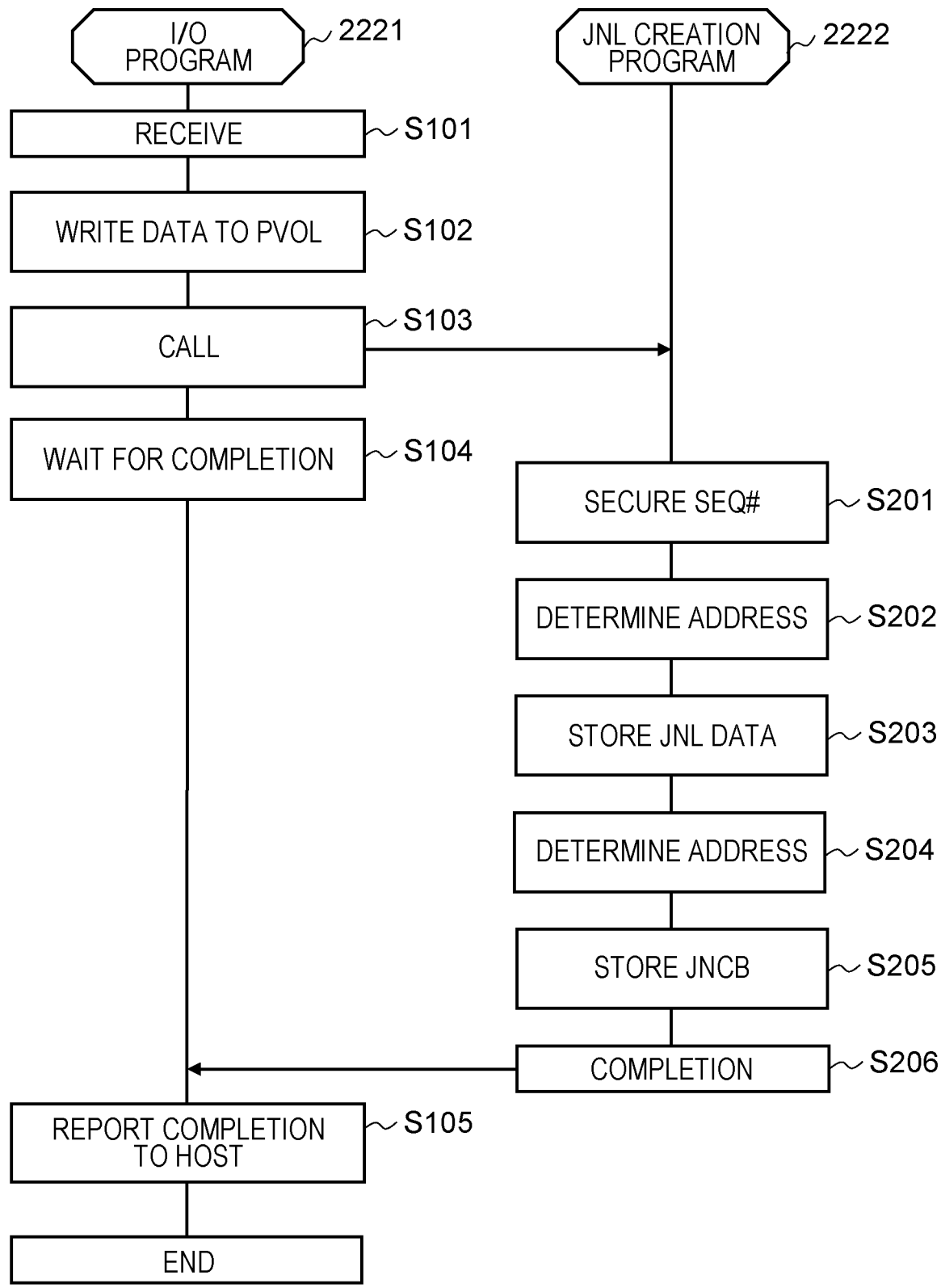
FIG. 9 illustrates a processing flow of write processing performed by the primary storage system.

FIG. 9 illustrates a processing flow of the write processing performed by the primary storage system 200A.

The I/O program 2221 receives a write request from the primary host 100A (S101). The I/O program 2221 writes the write target data accompanying the received write request to the PVOL 26A (S102), calls the JNL creation program 2222 (S103), and waits for completion of the JNL creation program 2222 (S104). The write target data may be temporarily stored in the cache memory area 223 and then written to the PVOL 26A, or may be written to the PVOL 26A without being stored in the cache memory area 223.

The called JNL creation program 2222 ensures the latest SEQ # (SEQ # after incrementing the current latest SEQ #) (S201). The JNL creation program 2222 determines a storage destination address (for example, the JVOL storage start address) of the JNL data (S202), creates the JNL data as a copy of the data written in S102 (for example, the data on the cache memory area 223), and stores the JNL data in the area (for example, the cache memory area 223 or the JNL data area 2522) indicated by the address determined in S202 (S203). In addition, the JNL creation program 2222 determines a storage destination address of the JNCB (S204), creates the JNCB including the SEQ # secured in S201, and stores the JNCB in an area (for example, the cache memory area 223 or the JNCB area 2521) indicated by the address determined in S204 (S205). The JNL creation program 2222 notifies the I/O program 2221 of the completion of the processing (S206).

When receiving the completion notification from the JNL creation program 2222, the I/O program 2221 reports the write completion to the primary host 100A (an example of a transmission source of the write request) (S105). The report of the write completion is performed without waiting for the storage of the journal data or the completion of the collective compression. In other words, the collective compression is performed asynchronously with the write processing.

In this write processing, in a case where the JNCB and the JNL data are stored in the cache memory area 223 of the primary storage system 200A, the JNCB and the JNL data may be stored from the cache memory area 223 to the JVOL 26A later. In a case where the JVOL 26A is an area based on the cache memory area 223, storage in the cache memory area 223 may correspond to storage in the JVOL 26A.

In the present embodiment, the JNL data is transferred from the primary storage system 200A to the secondary storage system 200B according to any of methods 1 to 3. Each of methods 1 to 3 will be described below.

<Description of Method 1>

Figure 10:
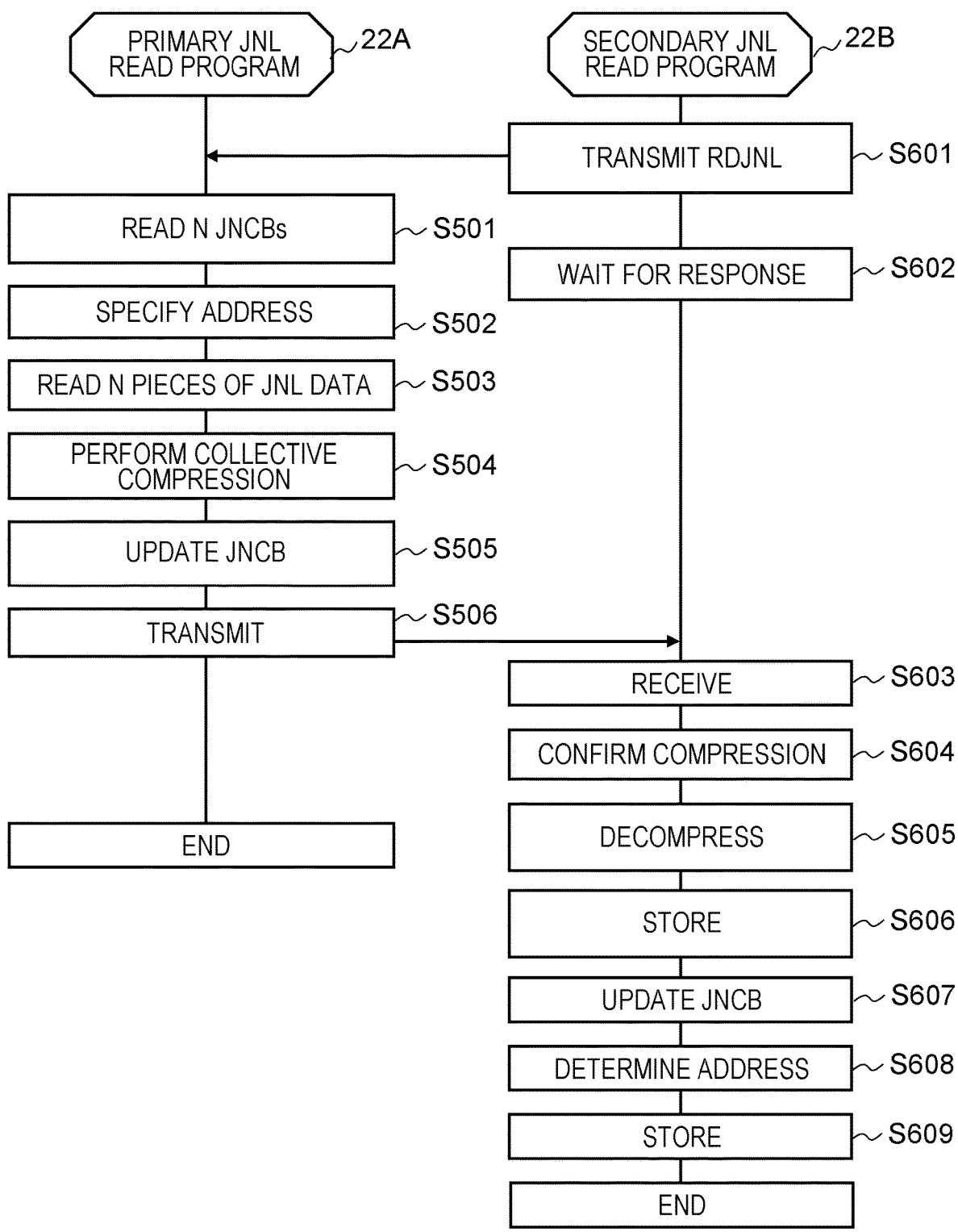
FIG. 10 illustrates a processing flow of JNL transfer processing according to method 1.

FIG. 10 illustrates a processing flow of the JNL transfer processing according to method 1.

According to method 1, N pieces of JNL data that are collectively compressed are transfer targets.

The secondary JNL read program 22B of the secondary storage system 200B transmits RDJNL (journal read request), which is a read request of JNL, to the primary storage system 200A (S601), and waits for a response from the primary storage system 200A (S602).

In response to the RDJNL received from the secondary storage system 200B, the primary JNL read program 22A of the primary storage system 200A reads the untransferred N JNCBs 2523 from the JVOL 26JA (S501), and specifies the JVOL storage start address 2243 of each of the N JNCBs 2523 (S502). The primary JNL read program 22A reads the JNL data from each address specified in S502 (S503), and performs collective compression of the read N pieces of JNL data (S504). The primary JNL read program 22A updates each of the N JNCBs 2523 corresponding to the N pieces of JNL data (S505). In each JNCB 2523 after being updated in S505, the compression bit 2244 is "ON" and the compressed size 2245 represents the collectively compressed size. The primary JNL read program 22A transfers the collectively compressed data (the collectively compressed N JNL data) and the updated N JNCBs 2523 to the secondary storage system 200B (S506). Instead of updating the compression bit 2244 and the compressed size 2245 of each JNCB 2523, for example, only the information of the JNCB 2523 having the smallest SEQ # among the transfer target JNLs may be updated. The primary JNL read program and the secondary JNL read program process each JNL by using the information of the JNCB 2523 having the smallest SEQ #.

The secondary JNL read program 22B of the secondary storage system 200B receives the N JNCBs 2523 and the collectively compressed data from the primary storage system 200A (S603). The secondary JNL read program 22B specifies the compression bit 2244 "ON" from each of the N JNCBs 2523 (S604), and decompresses the collectively compressed data into N pieces of JNL data (S605). The decompression may be performed by the secondary JNL read program 22B, or may be performed by an accelerator of the secondary storage system 200B. The secondary JNL read program 22B determines a storage destination address (for example, a JVOL storage start address) for each JNL data, and stores the JNL data in an area (for example, the cache memory area 223 or the JNL data area 2522) indicated by the determined address (S606). By using the decompressed data and the JNL data size 2242 stored in the N JNCBs 2523, the JNL data corresponding to each JNCB 2523 can be specified. Specifically, the decompressed data is divided by the JNL data size 2242 in ascending order of SEQ #. The secondary JNL read program 22B updates each of the N JNCBs 2523 (S607). In each JNCB 2523 updated in S607, the JVOL storage start address 2243 is the address of the region in the JVOL 26JB, the compression bit 2244 is "OFF", and the compressed size 2245 is an invalid value. The secondary JNL read program 22B determines a storage destination address of each JNCB updated in S607 (S608), and stores each JNCB in an area (for example, the cache memory area 223 or the JNCB area 2521) indicated by the address determined in S607 (S609).

Figure 15:
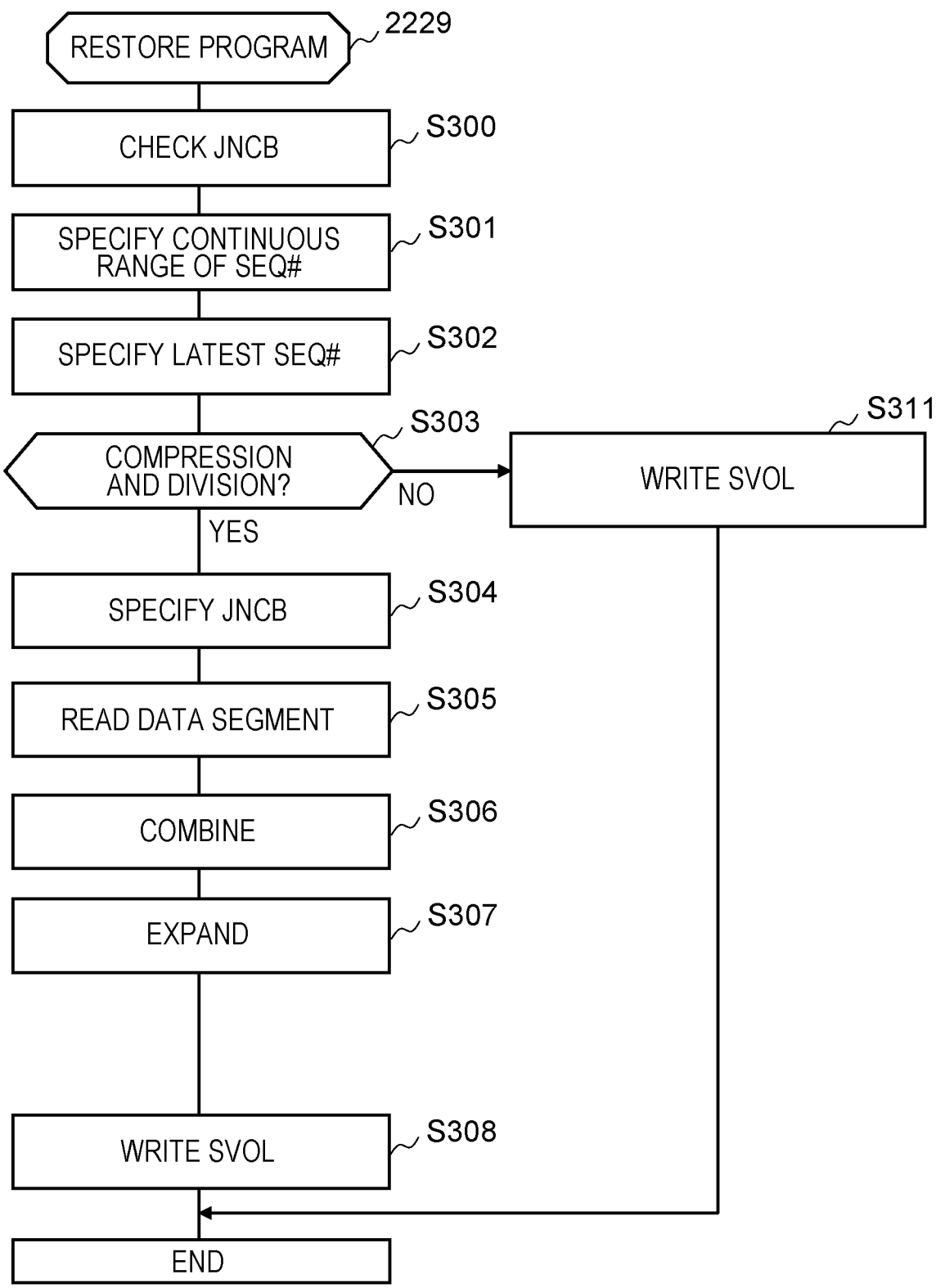
FIG. 15 illustrates a processing flow of a restore program.

Further, the decompression of the compressed data may be executed in the restore program described in FIG. 15. In this case, S604 and S605 are skipped. S606 stores the compressed data. In S607, the JVOL storage start address 2243 is changed to the address of the area in the JVOL 26JB. The compression bit 2244 and the compressed size 2245 are not changed.

According to method 1, since all the write target data are transfer targets, a short RPO is maintained. In addition, since the transfer target is data after the N pieces of JNL data are collectively compressed, an improvement in the reduction effect of the transfer target data is expected.

At least one of the following may be adopted.

Instead of S604 to S609, the collectively compressed data and N JNCBs may be stored in the JVOL 26JB. At the time of reflecting the JNL in the SVOL 26B (that is, at the time of the restoration processing), the collectively compressed data may be decompressed into N pieces of JNL data, and the decompressed N pieces of JNL data may be written in the SVOL 26B. In addition, the process of reflecting the JNL in the SVOL 26B needs to process the JNL transferred by one JNL read program. For example, a case where the JNL read program transfers the JNL of SEQ #1 to 50 in the first processing and transfers SEQ #51 to 100 in the second processing will be considered. The restoration processing also needs to be performed on SEQ #1 to 50. This is because the JNL data of SEQ #1 to 50 is collectively compressed. By storing the compression start SEQ #2248 and the compression end SEQ #2250 in the JNCB 2523, it is possible to recognize that the SEQ #1 to 50 are compressed together in the restoration processing.

The formed copy following the asynchronous remote copy (copy for initially matching the PVOL 26A and the SVOL 26B) may also include a process similar to the process illustrated in FIG. 10. At that time, in S503, the JNL data is read from the PVOL 26A instead of the JVOL 26JA.

<Description of Method 2>

The multiplicity of the JNL transfer processing affects the efficiency of the line between the storage systems 200A and 200B. For example, in a case where the multiplicity is "1", a period in which data is not transferred to the line increases, and utilization efficiency of the line decreases. For example, in the primary storage system 200A, data is not transferred to the line while the processor 212 is processing the RDJNL (for example, the JNCB is being updated or the JNL data is being transferred) or while a command of the RDJNL is transmitted. If another RDJNL can transfer data to the line while a certain RDJNL is not transferring data to the line, the use efficiency of the line is improved. For this reason, a multiplicity of RDJNL greater than "1" is required.

Regarding the collective compression of the N pieces of JNL data, it is expected that the larger the value of N, the higher the compression effect (the smaller the compression ratio, which is the ratio of the size of the compressed data to the size of the original data). However, if the value of N is too large, the multiplicity of the JNL transfer processing decreases. For example, when a large amount of JNL data is subjected to collective compression in one RDJNL processing, there is a possibility that the JNL data to be transferred does not exist in the primary storage system 200A even if the primary storage system 200A receives the next RDJNL during the RDJNL process.

Therefore, in method 2, the multiplicity and the number N of JNL data to be subjected to the collective compression are optimized. For example, it is expected to maintain the multiplicity at or above the required multiplicity (minimum required multiplicity) and increase the number of JNL data that is compressed together in response to one RDJNL.

The required multiplicity will be described. The required multiplicity may be calculated, for example, as in the following (Expression 1).

$$\text{Required multiplicity} = (\text{Round-trip time of RDJNL command} - \text{Data transfer time})/\text{Data transfer time} + 1 \quad \text{(Expression 1)}$$

(Round-trip time of RDJNL command−Data transfer time) means a time other than the time at which data is transferred by the RDJNL command. It is possible to calculate how many RDJNL commands for performing another data transfer are required at a time other than the time when the data is transferred by the RDJNL command by the above-described Expression 1. For example, assuming that the round-trip time of the read JNL command=1500 µs and the data transfer time=300 µs, (Round-trip time of the read JNL command−Data transfer time)=1200 µs. In this case, it is desirable that there is another RDJNL command that performs data transfer at a time of 1200 µs. Since the data transfer time of one RDJNL command is 300 µs, the data transfer can be performed without a gap (free time) in the time of 1200 µs with 4 RDJNL. That is, if five multiplexing is performed in total, the line bandwidth can be used up.

Further, the round-trip time of the RDJNL command is divided the following time:

Data transfer time
Processing time in the primary storage system
Processing time in the secondary storage system
RDJNL command transfer time.

The "processing time in the primary storage system" is a total value of a time during which the processor of the primary storage system 200A performs processing (processor processing time), a time during which data is transferred inside the primary storage system 200A (transfer time in the system), and the like. The "processing time in the secondary storage system" is a total value of a time during which the processor of the secondary storage system 200B performs processing (processor processing time), a time during which data is transferred inside the secondary storage system 200B (transfer time in the system), and the like. The "RDJNL command transfer time" is a time until the secondary storage system 200B issues the RDJNL command and the primary storage system 200A receives the RDJNL command. At these times, the data transfer corresponding to the RDJNL command is not performed.

The "processor processing time" may be a time required by the processor 212 for the processing of RDJNL. The "transfer time in the system" may be a time required for data transfer (for example, data transfer to the cache memory area 223 or the drive 218) in the storage system 200 in response to RDJNL, or may be a time during which the processor 212 is not used in the processing of RDJNL. The processor processing time and the transfer time in the system may be input from the administrator via the maintenance terminal 270, or may be measurement values inside the storage system 200.

Next, a method of determining these times will be described. A method of directly designating via the maintenance terminal 270, a method of calculating using information designated via the maintenance terminal 270, and a method of calculating by the storage system are conceivable. At least a part of the time (for example, a plurality of types of times as elements of the round-trip time of the RDJNL command) described above may be determined by any of these methods.

In the method of directly designating via the maintenance terminal 270, the required multiplicity may be input from an administrator via the maintenance terminal 270.

In the calculation method using the information designated via the maintenance terminal 270, for example, distance information and network bandwidth information between the primary storage system and the secondary storage system are received via the maintenance terminal 270. The RDJNL command transfer time can be calculated using the distance information, and the data transfer time can be calculated using the network band. The processing time in the storage system may be stored in advance in the memory of the storage system or may be observed by a method to be described later.

In the calculation method of the storage system, at least one of the following may be adopted. By calculation of the storage system, the multiplicity can be changed and handled when a delay of the storage system or the network changes.

The round-trip time of the read JNL command may be observed. This may be the time from the start of S900 in FIG. 13 to the end of S609 in FIG. 13.

The processing time in the primary storage system may be a time from when the primary storage system receives the RDJNL command to when the data transfer starts. This may be the time from the start of S901 in FIG. 13 to the end of S506 in FIG. 13.

The processing time in the secondary storage system may be a value obtained by observing and summing the time from the program activation to the reception of the RDJNL command by the secondary storage system and the time from the reception of the response of the RDJNL command to the program end. This may be a total value of the time from the start of S900 in FIG. 13 to the end of S602 in FIG. 13 and the time from the start of S603 in FIG. 13 to the end of S609 in FIG. 13.

As the RDJNL command transfer time, time such as heartbeat by the primary storage system and the secondary storage system may be observed.

The data transfer time is calculated by subtracting the processing time in the primary storage system, the processing time in the secondary storage system, and the RDJNL command transfer time from the round-trip time of the RDJNL command.

The required multiplicity may be calculated based on at least one of a distance (a value represented by the distance 22113) between the storage systems 200A and 200B and a network band (a value represented by the band 22114).

Figure 11:
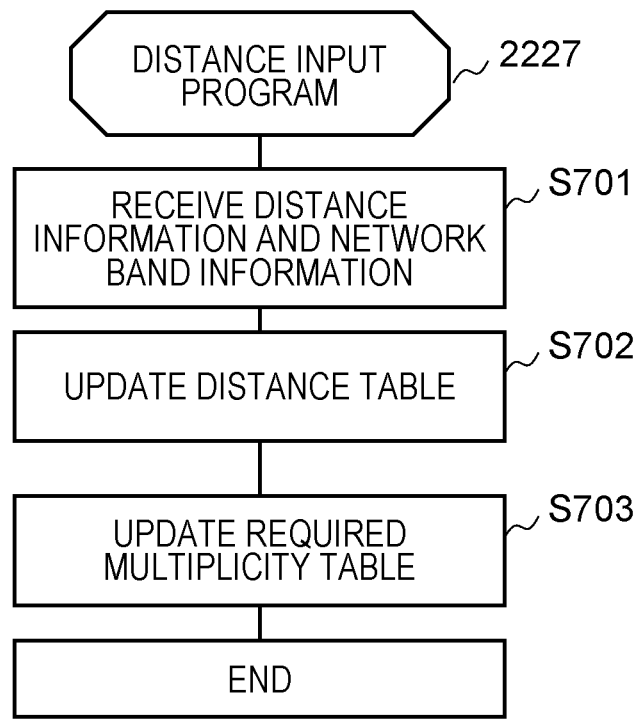
FIG. 11 illustrates a processing flow of a distance input program.

FIG. 11 illustrates a processing flow of the distance input program 2227.

The distance input program 2227 receives distance information (information indicating the distance between the storage systems 200A and 200B) and network bandwidth information (information indicating the network bandwidth between the storage systems 200A and 200B) from the administrator via the maintenance terminal 270 (S701).

The distance input program 2227 adds an entry including the received distance information and network bandwidth information to the distance table 2211 (S702).

The distance input program 2227 calculates the required multiplicity on the basis of at least one of the distance indicated by the distance information and the band indicated by the network band information, and adds an entry including the calculated required multiplicity to the required multiplicity table 2212 (S703). For example, as described above, the required multiplicity is calculated on the basis of the data transfer time, the processing time in the primary storage system, the processing time in the secondary storage system, and the RDJNL command transfer time. The RDJNL command transfer time is calculated from the distance information received in S701, and the data transfer case is calculated from the network bandwidth information. The required multiplicity is calculated by the calculation shown in (Equation 1). The processing time in the primary storage system and the processing time in the secondary storage system can be determined by storing them in the memory of the storage in advance or internally observing them as described above. The method for calculating the required multiplicity is also conceivable in a method other than the method described above. Methods other than those described above are also conceivable as a method of acquiring information necessary for calculating the required multiplicity. The required multiplicity may be calculated by any method.

In the case of the method calculated by the storage system, this program may be unnecessary. Instead, the storage system needs to observe various types of information and determine the required multiplicity. The storage system may periodically calculate and review the required multiplicity.

In addition, in a case where the multiplicity information and the information for calculating the required multiplicity are input by the user, the storage system side may also execute processing of observing various types of information and determining the required multiplicity. When the deviation between both calculation results is equal to or larger than a predetermined threshold value, the user may be notified of the review of the input information.

Figure 12:
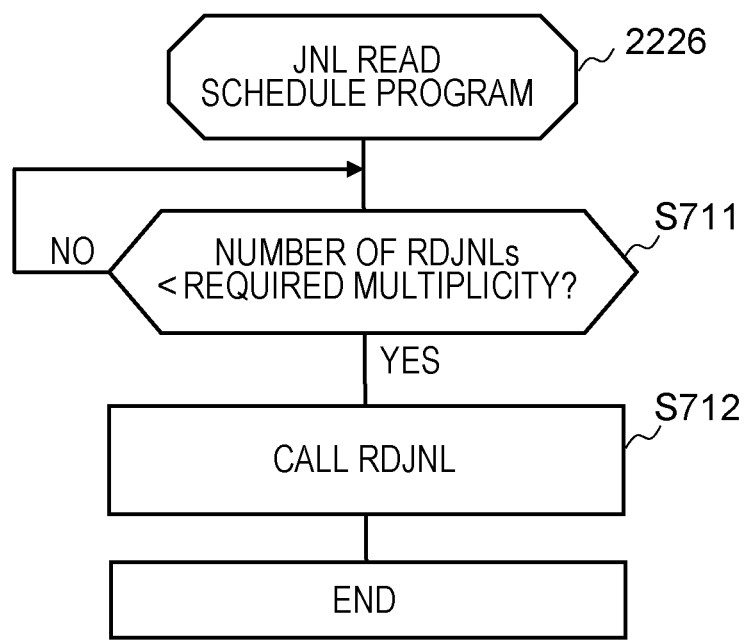
FIG. 12 illustrates a processing flow of a JNL read schedule program.

FIG. 12 illustrates a processing flow of the JNL read schedule program 2226.

In the secondary storage system 200B (or the primary storage system 200A), the JNL read schedule program 2226 refers to the required multiplicity table 2212 and determines whether the number of RDJNLs (the number of RDJNLs in processing) is less than the required multiplicity (S711).

When the determination result of S711 is true (S711: Yes), the JNL read schedule program 2226 calls the secondary JNL read program 22B (S712). As a result, the RDJNL is transmitted from the secondary JNL read program 22B, and as a result, the number of RDJNLs increases. The determination in S711 is realized by accessing the required multiplicity table 2212 and acquiring the required multiplicity.

Figure 13:
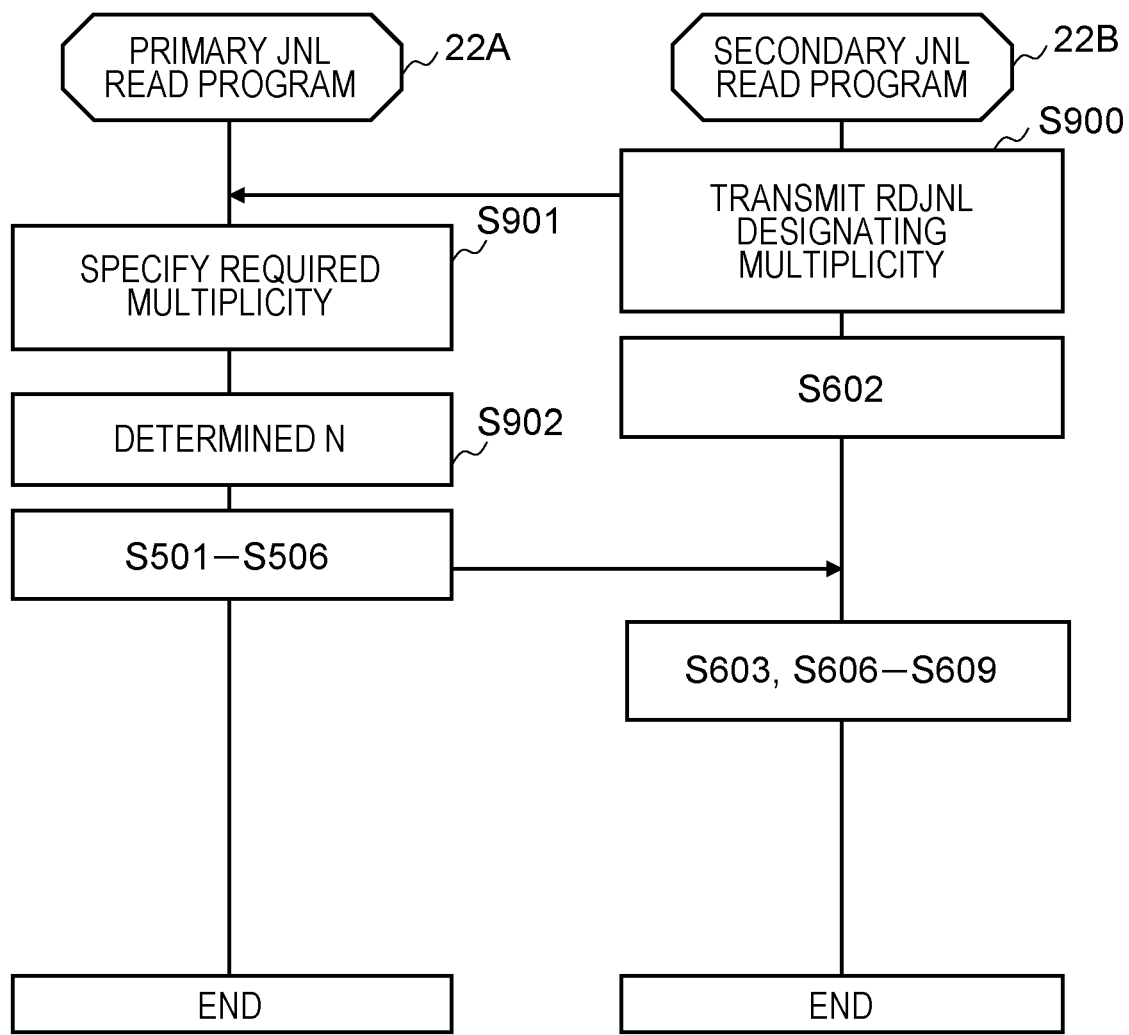
FIG. 13 illustrates a processing flow of JNL transfer processing according to method 2.

FIG. 13 illustrates a processing flow of the JNL transfer processing according to method 2. Hereinafter, differences from the JNL transfer processing according to method 1 will be mainly described, and description of common points with the JNL transfer processing according to method 1 will be omitted or simplified. In the example of FIG. 13, a method in which the secondary storage system calculates the required multiplicity and notifies the primary storage system of the required multiplicity by the RDJNL command will be described. The primary storage may calculate the required multiplicity.

The secondary JNL read program 22B of the secondary storage system 200B transmits RDJNL designating the required multiplicity calculated by the secondary storage system 200B (S900).

The primary JNL read program 22A of the primary storage system 200A receives the RDJNL from the secondary JNL read program 22B, and acquires the required multiplicity designated in the RDJNL command (S901).

The primary JNL read program 22A determines the number of transfer JNL (the number N of JNL data to be subjected to collective compression) on the basis of the required multiplicity acquired in S901 (S902). For example, the primary JNL read program 22A calculates Transfer JNL number=(Maximum multiplicity)÷(Required multiplicity specified by RDJNL)×(Transfer JNL number at the maximum multiplicity). For example, if it is assumed that N=64 at the required multiplicity "32", if the multiplicity is "16", then N=128 (=32÷16×64). The "maximum multiplicity" means the maximum of the allowed multiplicity. The JNL number calculated by (Maximum multiplicity)×(Transfer JNL number at the maximum multiplicity) is the total value (hereinafter, it is referred to as a "total JNL number") of the JNL numbers transferred in parallel. It is assumed that the total number of JNLs is designed so that the utilization efficiency of the line can be maintained high. Therefore, even when the multiplicity is reduced, it can be expected that the use efficiency of the line can be maintained high by maintaining the total number of JNLs.

Thereafter, S501 to S506 and S603 to S609 are performed.

<Description of Method 3>

In method 1 or 2, the number of pieces of JNL data that are collectively compressed and transferred in response to one RDJNL is N, but in method 3, N pieces of JNL data read in response to each of the M pieces of RDJNL are collectively compressed. That is, in method 3, the JNL data to be collectively compressed and transferred are (M×N) pieces of JNL data. As a result, the compression effect of the transfer target data is expected to be further improved.

Figure 14:
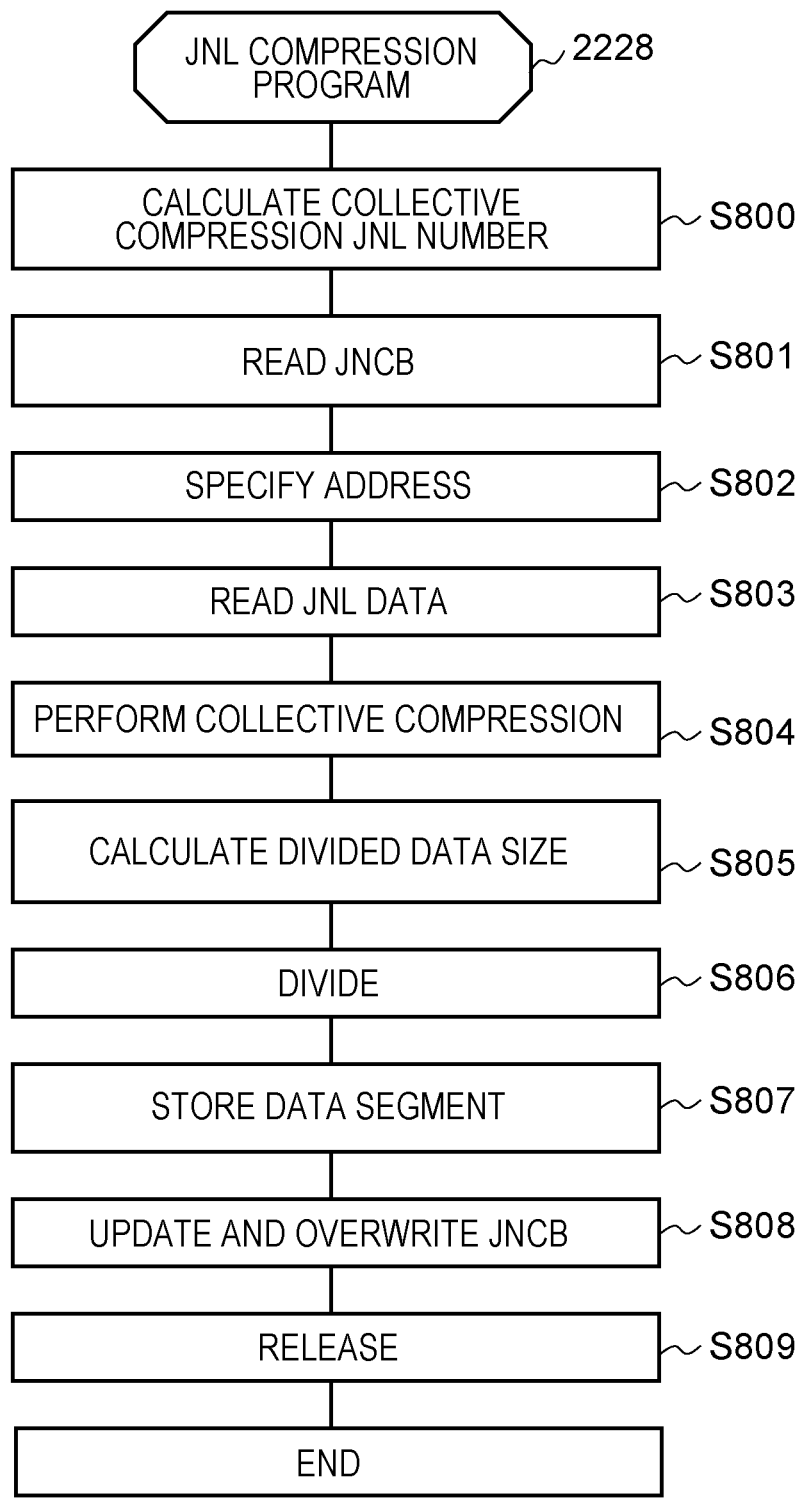
FIG. 14 illustrates a processing flow of a JNL compression program.

FIG. 14 illustrates a processing flow of the JNL compression program 2228. This processing is executed periodically.

The JNL compression program 2228 calculates the collective compression JNL number (S800). The value K of the collective compression JNL number is calculated, for example, as in the following (Expression 3). M means a required multiplicity, and N means a transfer JNL number.

$$K = M \times N \qquad \text{(Expression 3)}$$

In a case where method 2 is assumed, for example, the "required multiplicity" may be the required multiplicity specified from the required multiplicity table 2212. The "required multiplicity" may be a predetermined multiplicity when method 1 is assumed. In the following description of method 3, the required multiplicity in a case where method 2 is assumed and the multiplicity in a case where method 1 is assumed are simply referred to as "multiplicity" without distinction. The "number of transfer JNL" may be the number N of JNL data associated with the multiplicity (the number N of JNL data read in response to one RDJNL). The "multiplicity" may be notified from the secondary storage system 200B periodically or irregularly, or may be calculated in the primary storage system 200A periodically or irregularly.

The JNL compression program 2228 reads JNCB (K JNCBs) of SEQ # (m+(K−1)) from SEQ #m (S801). "SEQ #m" is the oldest SEQ # in the SEQ # of the JNL data that is not collectively compressed.

The JNL compression program 2228 specifies the JVOL storage start address 2243 for each of the read K JNCBs 2523 (S802), and reads the JNL data from the area indicated by the address 2243 (S803). The JNL compression program 2228 collectively compresses the read K pieces of JNL data (S804).

The JNL compression program 2228 calculates the compressed size of the collectively compressed data (the K pieces of JNL data subjected to collective compression), and calculates the divided data size (=(Compressed size) (Multiplicity)) (S805). The method of calculating the divided data size is an example, and other methods may be used. By using the above calculation formula, the amount of data transferred by each RDJNL can be made the same. As a result, when there are a plurality of paths for remote copy, the utilization rates of the paths can be equalized. It is possible to avoid deterioration of efficiency due to bias of the utilization rate of the path. The JNL compression program 2228 divides the collectively compressed data by the divided data size (S806). As a result, the collectively compressed data is divided into p (p is an integer of 2 or more) compressed data segments each having the same data size as the divided data size. The JNL compression program 2228 stores the p compressed data segments in the JVOL 26JA (or another area such as a buffer) (S807). The JNL compression program 2228 updates the JNCB for each of the K JNCBs 2523 read in S801 (0 or more compressed data segments are associated with JNCB), and overwrites the JNCB in the JVOL 26A with the updated JNCB (S808). The update of the JNCB is the update of the JVOL storage start address, the compression bit, the size after compression, the division bit, the divided data size, the compression start SEQ #, and the compression end SEQ #.

The JVOL storage start address is the JVOL storage start address of the compressed data segment read on the basis of the JNCB (for example, the address of the buffer or the JVOL 26JA). The JNCB of each RDJNL is updated. Since the corresponding compressed data segments are different in each RDJNL, the JVOL storage start addresses stored by the JNCB of each RDJNL are different addresses.

The compression bit has the same meaning as method 1 or method 2, and "ON" is stored therein. The JNCB of each RDJNL is updated.

The compressed size has the same meaning as method 1 or method 2, and the compressed sizes of the K pieces of JNL data are stored. The JNCB of each RDJNL is updated.

The division bit is information indicating whether it is divided into compressed data segments, and "ON" is stored therein. That is, it is information indicating whether the method is method 3. The JNCB of each RDJNL is updated.

The divided data size is a size calculated by the above-described calculation formula. The JNCB of each RDJNL is updated.

The compression start SEQ #2248 and the compression end SEQ #2250 represent the head SEQ # and the tail SEQ # of the K pieces of JNL data. The compression start SEQ #2248 and the compression end SEQ #2250 of all the JNCBs (K pieces) are updated. As a result, it is possible to determine which JNL is compressed collectively. Any information other than the compression start SEQ #2248 and the compression end SEQ #2250 may be used as long as it is information for specifying which JNL data is collectively compressed. For example, a collective compression counter or the like may be used.

For each of the K JNCBs 2523 read in S801, the JNL compression program 2228 releases the area where the uncompressed JNL data corresponding to the JNCB is stored (S809). It is possible to write another JNL data (or compressed data segment) in the released area. That is, the released area becomes a free area.

In the processing illustrated in FIG. 14, K=M×N may be satisfied (M is the number of RDJNLs, and N is the number of JNL data transferred in response to one RDJNL), but K may be a part of M×N.

The JNL transfer processing according to method 3 is a process not including S504 and S505 in the JNL transfer processing in the primary storage system illustrated in FIG. 10. In the secondary storage system illustrated in FIGS. 13, S604 and S605 are skipped. S606 stores the compressed data. In S607, the JVOL storage start address 2243 is changed to the address of the area in the JVOL 26JB. The compression bit 2244 and the compressed size 2245 are not changed. That is, the primary JNL read program 22A transfers the compressed data segment (a part of the collectively compressed data) read from the JVOL storage start address indicated by the JNCB. Further, the "JNL data" read in S503 is a "compressed data segment" in method 3. That is, in method 3, p/M compressed data segments are transferred instead of the collectively compressed data in which the N pieces of JNL data are collectively compressed. The secondary JNL read program 22B stores the compression in the JVOL 26JB without decompressing the compression. In the description, the JNL compression program to be periodically executed executes from S800 to SS809, but the I/O program or the JNL creation program may be executed. For example, it is conceivable to execute the processing after S105 or S205. The processing may be executed by other programs or triggers.

FIG. 15 illustrates a processing flow of the restore program 2229.

In the secondary storage system 200B, the restore program 2229 checks JNCB stored in the JVOL 26JB (S300), specifies a range in which SEQ # is continuous from the oldest SEQ # among JNLs not reflected in the SVOL 26B (S301), and specifies the latest SEQ # in the specified range (S302). For each SEQ # in the continuous range of SEQ #, the restore program 2229 determines whether the compression bit 2244 is "ON" and the division bit 2246 is "ON" in the JNCB including the SEQ # (S303).

When the determination result in S303 is false (S303: No), the restore program 2229 performs S311. In S311, the following is performed.

When the compression bit 2244 is "ON" and the division bit 2246 is "OFF", the restore program 2229 specifies N JNCBs (for example, N JNCBs having the same compression start SEQ # and compression end SEQ #) corresponding to the collective compression, reads the collectively compressed data from the JVOL 26B on the basis of the N JNCBs, and decompresses the collectively compressed data to acquire N pieces of JNL data. For each of the N JNCBs, the restore program 2229 writes JNL data corresponding to the JNCB in the SVOL area indicated by the address corresponding to the PVOL address indicated by the JNCB.

When the compression bit 2244 is "OFF", the restore program 2229 specifies JNCB in the oldest JNL not reflected in the SVOL 26B, and reads the JNL data from the JVOL 26JB on the basis of the JNCB. The restore program 2229 writes the read JNL data in the SVOL area indicated by the address corresponding to the PVOL address indicated by the JNCB.

When the determination result in S303 is true (S303: Yes), the restore program 2229 specifies K JNCBs (for example, K JNCBs having the same compression start SEQ # and compression end SEQ #) corresponding to the collective compression (S304), and reads the compressed data segment from the JVOL 26JB on the basis of each JNCB (S305). The restore program 2229 combines the read p compressed data segments (S306), and decompresses the collectively compressed data which is the combined p compressed data segments into K pieces of JNL data (S307). By using the decompressed data and the JNL data size 2242 stored in the N JNCBs 2523, the JNL data corresponding to each JNCB 2523 can be specified. Specifically, the restore program 2229 divides the decompressed data by the JNL data size 2242 in ascending order of SEQ #. The restore program 2229 writes each of the K pieces of JNL data in the SVOL 26B (the area in the SVOL represented by the address corresponding to the PVOL address represented by the JNCB) in the order of SEQ # (S308).

Note that the restoration to the SVOL 26B may be executed in parallel by a plurality of jobs. If the same job is responsible for the restoration in which the same address of the SVOL 26B is the restoration destination, it is possible to avoid a so-called throwback in which JNL data with a newer SEQ # is rewritten to JNL data with an older SEQ # even if the restoration is not performed in the order of SEQ # as a whole.

The foregoing is a description of methods 1 to 3. Note that, in the present embodiment, the "remote copy processing" is a process until the JNL data, which is a copy of the data written in the PVOL 26A, is reflected in the SVOL 26B via the JVOL 26JA and 26JB. The remote copy processing includes JNL transfer processing and restoration processing. The "JNL transfer processing" is a process from the start of the process for the transfer of JNL until the end of the storage of the transferred JNL. In the present embodiment, it is a process from the start of the transmission of RDJNL by the secondary storage system 200B until the JNL included in the response to the RDJNL (the response from the primary storage system 200A) is stored in the secondary storage system 200B. The "restoration processing" is a process in which the JNL data is written to the SVOL 26B in the secondary storage system 200B, and specifically, for example, is a process illustrated in FIG. 15 described later. In addition, in the present embodiment, data is transferred in response to RDJNL from the secondary storage system 200B, but WRJNL (write request of JNL) may be transmitted from the primary storage system 200A to the secondary storage system 200B, and data associated with the WRJNL (at least a part of a plurality of JNCBs and collectively compressed data) may be stored in response to the WRJNL. In addition, compression may be designated in RDJNL, and collective compression may be performed since compression is designated in RDJNL. In addition, any of methods 1 to 3 may be designated in the RDJNL, and compression for transfer processing according to the designated method may be performed. In a case where the compression is not designated in the RDJNL, the uncompressed JNL data may be the transfer target. Further, for ease of description, in the following description, the compression and the expansion are performed by the processor 212, but the compression and the decompression may be performed by the accelerator 217. Although the information illustrated in FIG. 6 is stored in the JNCB, the information may be stored and transferred as parameters of the WRJNL or RDJNL command. Further, the JNCB is an example of the metadata of the journal, but the metadata may be associated as a parameter of the WRJNL or RDJNL command.

Second Embodiment

A second embodiment will be described. At that time, differences from the first embodiment will be mainly described, and description of common points with the first embodiment will be omitted or simplified (the same applies to the later-described embodiments other than the second embodiment).

Figure 16:
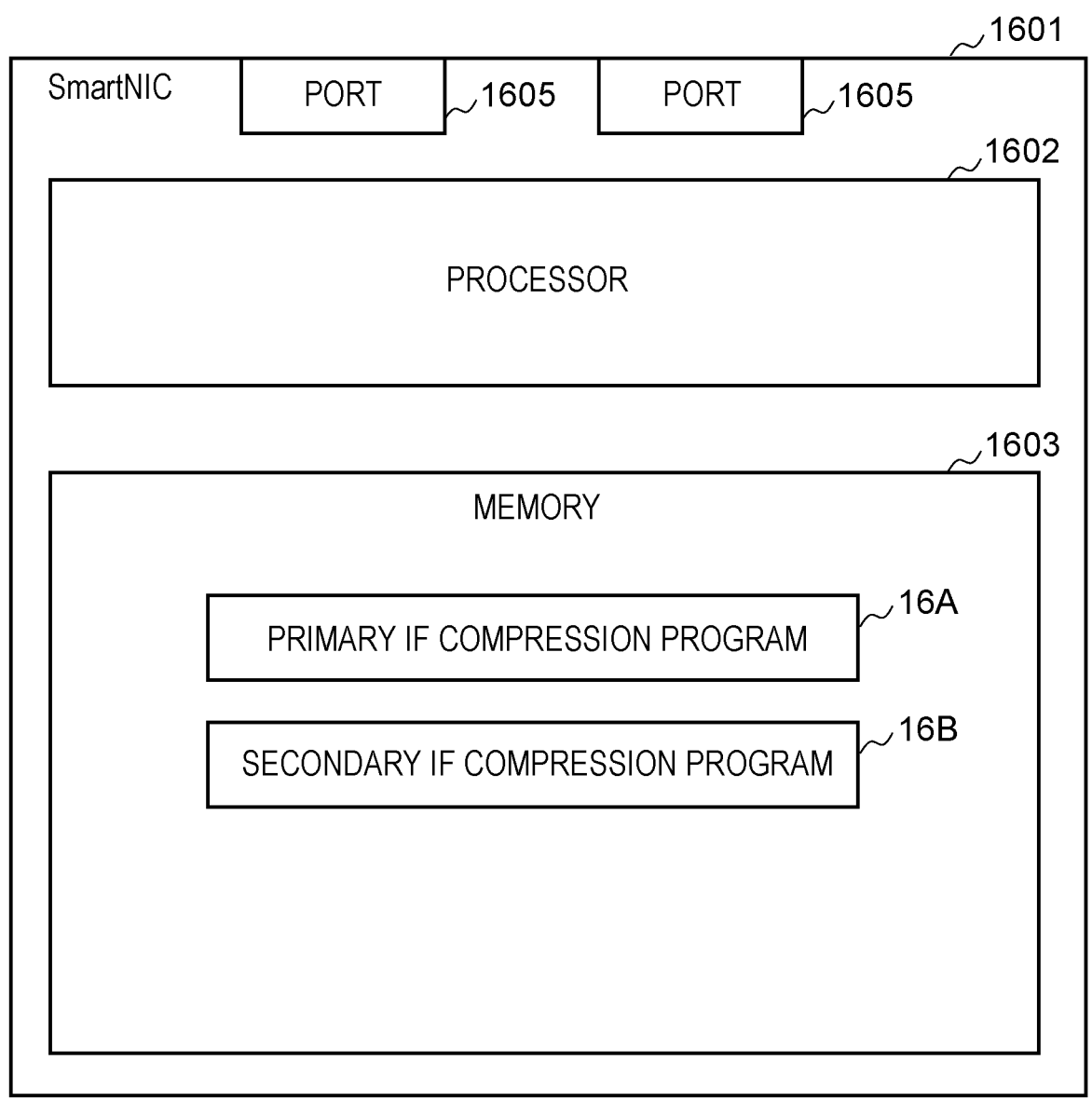
FIG. 16 illustrates a configuration example of a Smart-NIC.

FIG. 16 illustrates a configuration example of a SmartNIC.

The SmartNIC 1601 is employed as at least the accelerator 217 of the accelerator 217 and the FE-IF 211. That is, the SmartNIC 1601 is an example of an accelerator of compression (and decompression). The SmartNIC 1601 has a port 1605, a compression circuit 1604, a memory 1603 and a processor 1602 connected thereto. The memory 1603 stores a primary IF compression program 16A and a secondary IF compression program 16B, and the processor 1602 executes the programs to implement the compression function. The processor 1602 may be a processor in a broad sense including a hardware circuit that executes at least a part of the compression processing.

In addition to the IF compression program 16, at least one of the above-described programs 22A, 22B, 2221, 2222, and 2226 to 2229 may be stored in the memory 1603 as a program executed by the processor 1602.

The SmartNIC 1601 of the primary storage system 200A and the SmartNIC 1601 of the secondary storage system 200B are communicably connected to each other (for example, via a network).

Figure 17:
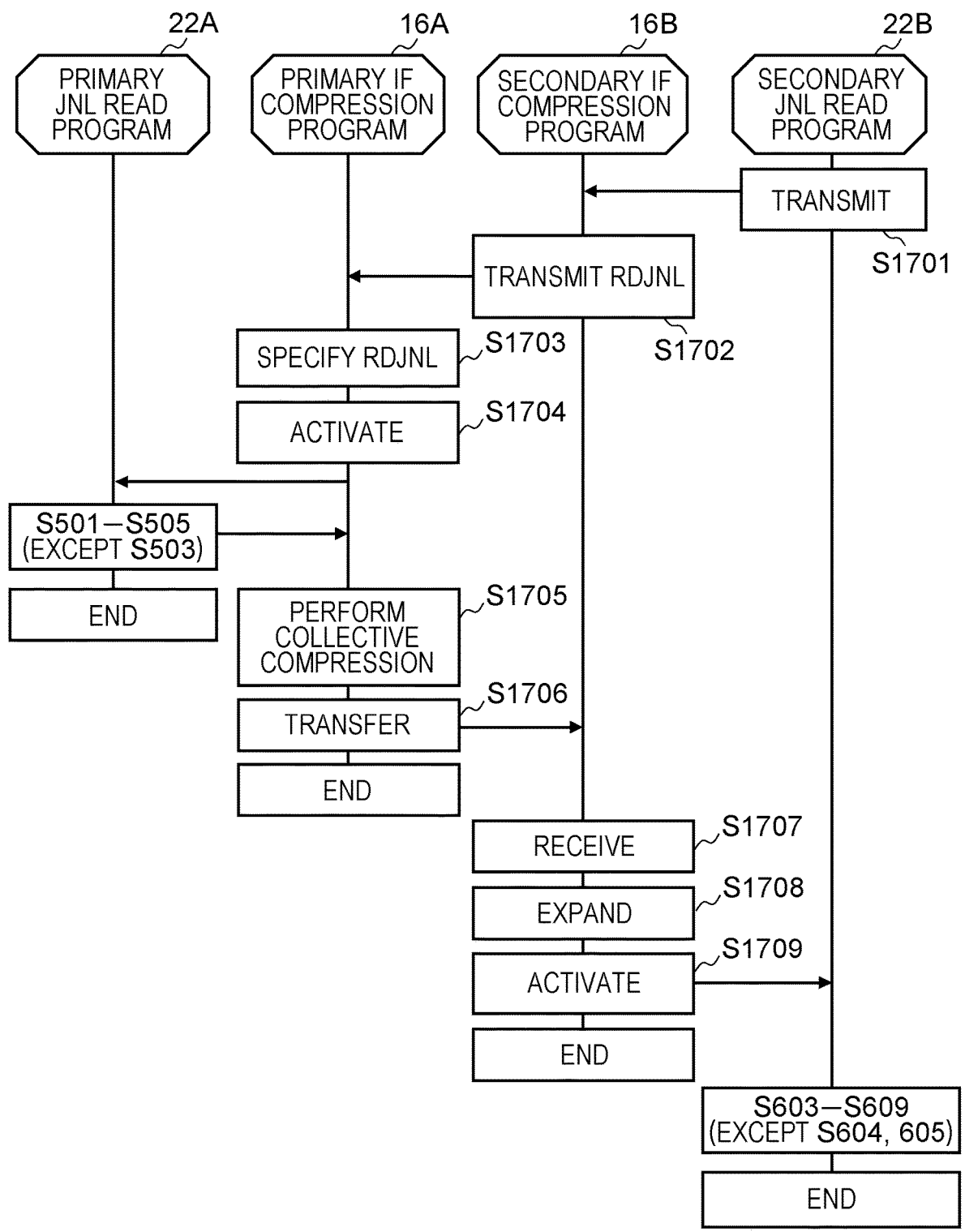
FIG. 17 illustrates a processing flow of JNL transfer processing according to a second embodiment.

FIG. 17 illustrates a processing flow of the JNL transfer processing according to the second embodiment. Here, method 1 of methods 1 to 3 is taken as an example.

The secondary JNL read program 22B of the secondary storage system 200B transmits an instruction of RDJNL (or RDJNL itself) to the secondary IF compression program 16B (S1701). When receiving the instruction of RDJNL (or RDJNL itself) from the secondary JNL read program 22B, the secondary IF compression program 16B transmits RDJNL (S1702). The information included in the RDJNL may be included in the instruction from the secondary JNL read program 22B.

The primary IF compression program 16A specifies that the received information is RDJNL (S1703), and activates the primary JNL read program 22A (S1704). The activated primary JNL read program 22A executes S501 to S506 (excluding S504) in FIG. 10.

The primary IF compression program 16A receives the N JNCBs and the N pieces of JNL data to be compressed, collectively compresses the N pieces of JNL data (S1705), and transfers the N JNCBs and the collectively compressed data to the secondary IF compression program 16B (S1706).

The secondary IF compression program 16B receives the N JNCBs and the collectively compressed data (S1707), and decompresses the received collectively compressed data into the N pieces of JNL data (S1708). The secondary IF compression program 16B activates the secondary JNL read program 22B and transfers the N JNCBs and the N pieces of JNL data to the secondary JNL read program 22B (S1709).

The secondary JNL read program executes S603 to S609 (excluding S604 and S605) in FIG. 10.

Note that, in the processing illustrated in FIG. 17, the secondary JNL read program 22B and the primary JNL read program 22A may determine the necessity of compression. When the compression is necessary, the compression instruction is issued, and the primary IF compression program 16A may perform the collective compression when receiving the compression instruction.

According to the second embodiment, a portion of the processing load (e.g., collective compression) of the processor 212 of the controller 210 can be offloaded to the SmartNIC 1601.

Third Embodiment

In the third embodiment, a reception size that is an upper limit of a data size that can be received by the compression function is determined, and the compression function compresses data for each size T. The size T is equal to or smaller than the reception size and is larger than the size of one piece of JNL data. For example, it is conceivable that there is an upper limit of the reception size in a case where the storage system is equipped with the accelerator 217 and the accelerator 217 performs compression. In the following description, the accelerator 217 is assumed as the compression function, but a compression function other than the accelerator may be used. For example, the processor may perform compression. By using the accelerator, the processing time can be shortened as compared with the compression and decompression processing using the processor 212. Further, when executed by the processor 212, a compression algorithm with a high compression rate that is not practical can be used because the processing time is too long. In this case, the reduction rate of the transfer data can be improved. In addition, it is not necessary to use the processor 212 for compression and decompression, and the influence on other processing (such as I/O processing) processed by the processor 212 can be minimized.

Figure 18:
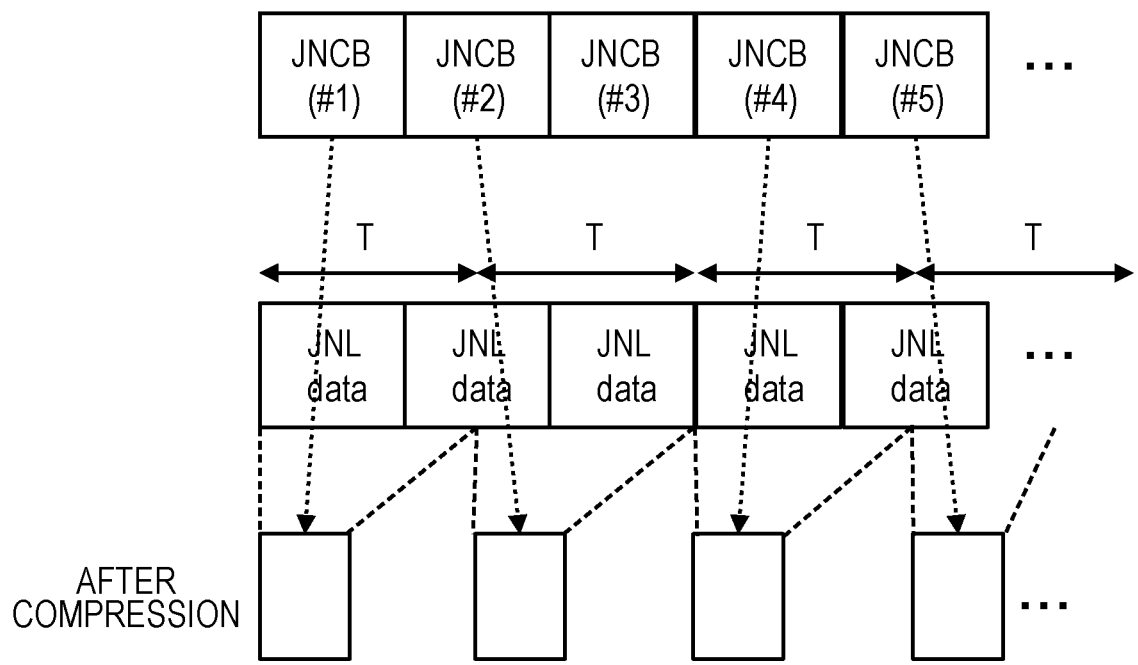
FIG. 18 illustrates an example of a relationship between JNCB and compressed data.

FIG. 18 illustrates an example of a relationship between JNCB and compressed data.

In the third embodiment, a reception size T which is a data size that can be received by the accelerator 217 is determined. Each of the N pieces of JNL data is divided into q (q is an integer of 1 or more) data segments of the reception size T, and each data segment is compressed by the accelerator 217. In this manner, by dividing the data into the reception size of the accelerator, compression and decompression using the accelerator can be performed.

According to the example illustrated in FIG. 18, since q data segments are compressed for each of the N JNCBs, the JNCB to which the compressed data segment is associated and the JNCB to which the compressed data segment is not associated are mixed in the N JNCBs after the compression.

A method of associating q compressed data segments with N JNCBs will be described. For the compressed data segment a, a method of managing the data of the head address of the data segment before compression by the JNCB that has managed the data is considered. A dashed arrow from the JNCB to the compressed data segment shown in FIG. 18 illustrates this relationship. A plurality of compressed data segments may correspond to one JNCB, for example, when the JNL data size is large.

Figure 19:
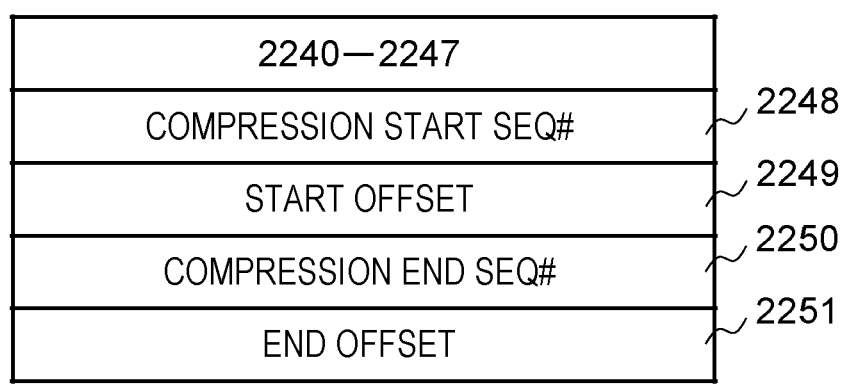
FIG. 19 illustrates a configuration example of JNCB according to a third embodiment.

FIG. 19 illustrates a configuration example of JNCB according to the third embodiment.

The JNCB 2523 further includes the following information 2249 and 2251. Further, the definition of the compression start SEQ #2248 and the compression end SEQ # 2250 is as follows.

The compression start SEQ #2248 represents SEQ # corresponding to the start portion of the data of the reception size T.

The start offset 2249 represents an offset from the head of the JNL data corresponding to SEQ # represented by the compression start SEQ #2248.

The compression end SEQ #2250 indicates SEQ # corresponding to the end portion of the data of the reception size T.

The end offset 2251 represents an offset from the head of the JNL data corresponding to SEQ # represented by the compression end SEQ #2250.

In the third embodiment, the compression start SEQ #2248, the start offset 2249, the compression end SEQ #2250, and the end offset 2251 are used to associate the decompressed data with the JNCB. Specifically, when the compressed data segment a is decompressed into a data segment a and the compressed data segment b is decompressed into a data segment b, the JNL data may be recovered by combining the data segment a and a part of the data segment b. Using the compression start SEQ #2248, the start offset 2249, the compression end SEQ #2250, and the end offset 2251, it is possible to easily specify the data before compression corresponding to each SEQ #.

On the other hand, a method of not using compression start SEQ #2248, start offset 2249, compression end SEQ #2250, and end offset 2251 is also conceivable. A specific example will be described. All compressed data segments are decompressed and the decompressed data segments are combined in SEQ # order. Then, by dividing the combined data segment by the JNL data size stored in the JNCB, the JNL data of each JNCB can be specified. Therefore, it is also possible to realize the third embodiment with the JNCB illustrated in FIG. 6.

Figure 20:
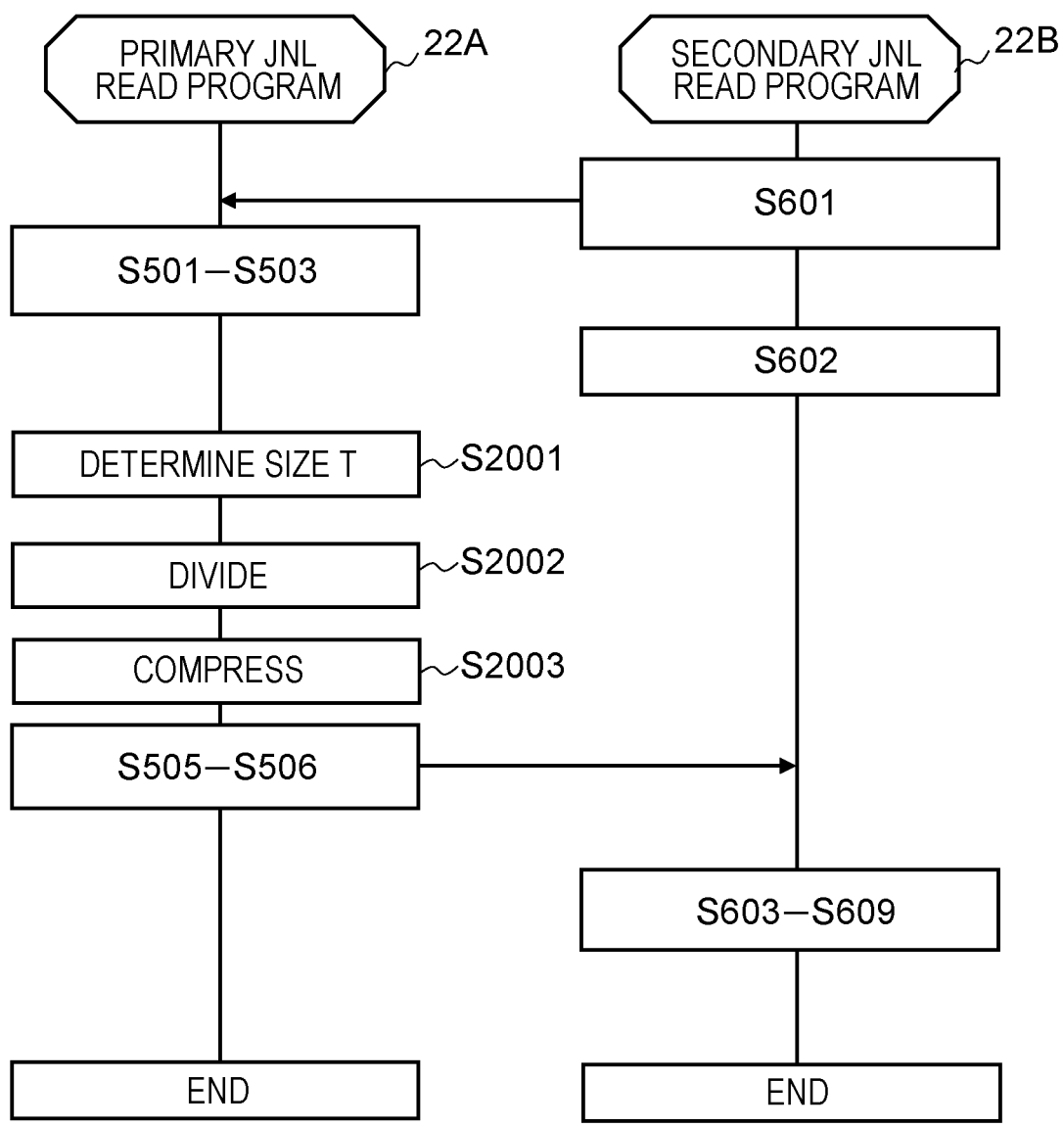
FIG. 20 illustrates a processing flow of JNL transfer processing according to the third embodiment.

FIG. 20 illustrates a processing flow of the JNL transfer processing according to the third embodiment. Here, method 1 of methods 1 to 3 is taken as an example.

Instead of S504 in FIGS. 10, S2001 to S2003 are performed. That is, the primary JNL read program 22A determines the size T (S2001), and divides the N pieces of JNL data by the size T (S2002). As a result, q data segments each having the size T are obtained. The primary JNL read program 22A causes the accelerator 217 to compress each data segment (S2003). As a result, q compressed data segments are obtained. Note that the size T may be an example of a division size that is a size equal to or smaller than the reception size. The N pieces of JNL data are divided by the division size. In the present embodiment, the division size and the reception size are the same. In addition, typically, the reception size and the division size are larger than the size of one piece of JNL data. Thus, typically, q is less than N.

In S505, the primary JNL read program 22A updates the compressed size of the JNCB associated with the compressed data segment. That is, the compressed sizes of the q JNCBs corresponding to the q compressed data segments among the N JNCBs are updated. Since q is typically less than N, some of the N JNCBs are not associated with any compressed data segment. The primary JNL read program 22A may turn on the compression bit of each of the N JNCBs. The secondary storage system 200B can specify the q compressed data segments to be decompressed by dividing the transferred JNL data (data configured by q compressed data segments) by the compressed data size represented by each of the q JNCBs associated with the JNL data. In a case where the compression start SEQ #2248, the start offset 2249, the compression end SEQ #2250, and the end offset 2251 are used, the information of the q JNCBs is updated.

In S506, N JNCBs and q compressed data segments are transferred. In S605, q compressed data segments are each decompressed by the accelerator 217 in the secondary storage system 200B. In the decompression processing, the secondary JNL read program acquires the compressed data size stored in the q JNCBs. The transferred JNL data is divided by the compressed data size, and the decompression processing is performed on each divided JNL data.

The process of associating the decompressed data with each JNCB is similar to the method described in the first embodiment.

In the third embodiment, compression in the formed copy may also be performed by the accelerator 217. For example, the primary storage system 200A includes a formed copy source program 21A, and the secondary storage system 200B includes a formed copy target program 21B. These programs 21A and 21B form and copy from the PVOL 26A to the SVOL 26B. Note that the "formed copy" is an initial data copy performed from the PVOL 26A to the SVOL 26B in order to match the content of the SVOL 26B with the content of the PVOL 26A in a case where the volume pair of the PVOL 26A and the SVOL 26B is configured. For example, in a case where a new SVOL is associated with the PVOL 26A as a pairing partner, the formed copy may be performed between the PVOL 26A and the new SVOL.

Figure 21:
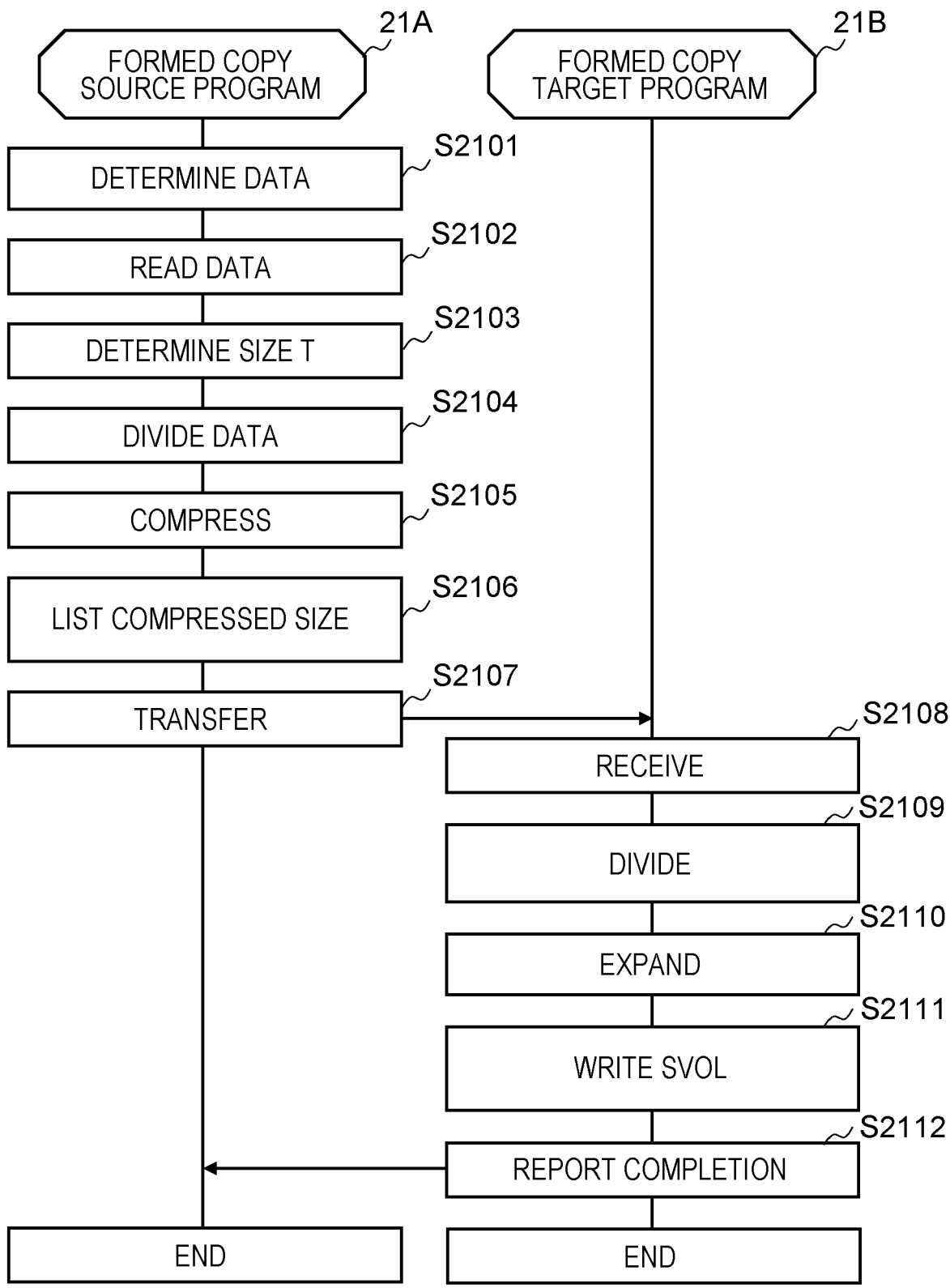
FIG. 21 illustrates a processing flow of formed copy according to the third embodiment.

FIG. 21 illustrates a processing flow of the formed copy according to the third embodiment.

The formed copy source program 21A determines data to be formed copy (S2101), and reads the determined data from the PVOL 26A (S2102). The formed copy source program 21A determines the size T (S2103), divides the entire data read in S2102 by the size T (S2104), and causes the accelerator 217 to compress each data segment obtained by the division (S2105). The formed copy source program 21A lists the compressed size of each data segment (S2106), and transfers a formed copy request in which the list of the compressed sizes and the transfer compressed data (data including a plurality of compressed data segments) are associated with each other to the secondary storage system 200B (S2107).

The formed copy target program 21B receives the formed copy request (S2108), and performs the next processing in response to the formed copy request. That is, the formed copy target program 21B divides the transfer compressed data into each compressed data segment based on the list of the compressed sizes (S2109), decompresses each compressed data segment (S2110), writes the decompressed data to the SVOL 26B (S2111), and reports completion to the primary storage system 200A (S2112).

The transfer processing of FIG. 21 may be realized by RDJNL as described above, or may be realized by the primary storage system writing data to the secondary storage system. Further, various types of information (at least a part of the information 2240 to 2251) may be stored in the JNCB. In the case of the write method, various types of information (at least a part of the information 2240 to 2251) may be associated with the write command as parameters of the write command.

Although several embodiments have been described above, these are merely examples for explaining the invention and are not intended to limit the scope of the present invention to only these embodiments. The present invention can be implemented in other various forms.

What is claimed is:

1. A remote copy system comprising:
   a primary storage system having a primary volume; and
   a secondary storage system including a secondary volume configuring a volume pair with the primary volume,
   wherein journal data is associated with metadata that includes a write order of the journal data, the journal data is a copy of data written in the primary volume, and the primary storage system performs collective compression of data that i) is at least a part of a plurality of pieces of the journal data in a plurality of journals and ii) is larger than a size of one journal data,
   wherein i) collectively compressed data which is the data that has been collectively compressed and ii) a plurality of pieces of the metadata corresponding to the collectively compressed data, are transfer targets from the primary storage system to the secondary storage system,
   and
   wherein the secondary storage system acquires a second plurality of pieces of journal data by decompressing one or more pieces of the collectively compressed data received from the primary storage system, and writes the second plurality of pieces of journal data to the secondary volume according to the write order represented by each of the plurality of pieces of the metadata that are received from the primary storage system.

2. The remote copy system according to claim 1, wherein, for each journal I/O request, the collectively compressed data and the plurality of pieces of the metadata are transferred from the primary storage system to the secondary storage system, the plurality of pieces of the metadata are N (N is an integer of 2 or more) pieces of the metadata in N journals, and
   wherein the journal I/O request is either a journal read request from the secondary storage system to the primary storage system or a journal write request from the primary storage system to the secondary storage system.

3. The remote copy system according to claim 2, wherein, for each of the journal I/O request, the primary storage system reads the data and collectively compresses the data, and the data is N pieces of the journal data.

4. The remote copy system according to claim 3, wherein a value of N is a value determined based on a required multiplicity that is a minimum required multiplicity of journal transfer processing, and
   wherein the journal transfer processing is processing from start of transmission of a journal I/I request to storage of data, corresponding to the journal I/O request, the secondary storage system.

5. The remote copy system according to claim 4, wherein the value of N is a maximum value of a range in which a multiplicity of the journal transfer processing is greater than or equal to the required multiplicity.

6. The remote copy system according to claim 4, wherein the required multiplicity is based on at least one of a distance between the primary storage system and the secondary storage system and a band.

7. The remote copy system according to claim 1, wherein the plurality of pieces of the metadata are N (N is an integer of 2 or more) pieces of the metadata in N journals, the primary storage system divides the collectively compressed data into a plurality of compressed data segments for each journal I/O request, the plurality of compressed data segments and N pieces of the metadata are transferred from the primary storage system to the secondary storage system, and
   wherein the secondary storage system acquires the collectively compressed data by combining the plurality of compressed data segments.

8. The remote copy system according to claim 7, wherein a number of pieces of journal data that is collective compressed is based on a product of a multiplicity of journal transfer processing and a number of pieces of journal data per journal data I/O request, and
   and
   wherein the journal transfer processing is processing from start of transmission of a journal I/O request to storage of data, corresponding to the journal I/O request, the secondary storage system.

9. The remote copy system according to claim 8, wherein a size of each compressed data segment, of the plurality of compressed data segments, is based on a value calculated by dividing a size of the collectively compressed data by a multiplicity of the journal transfer processing.

10. The remote copy system according to claim 1, wherein the primary storage system specifies a plurality of journals that have not been transferred to the secondary storage system each time one or more journals, of the plurality of journals, are transferred to the secondary storage system, and performs the collective compression on the plurality of specified journals,
    wherein each of the plurality of pieces of the metadata in the transfer targets includes information indicating that compression is performed and information indicating a compressed size that is a size of the collectively compressed data, for each transfer for which the collective compression is performed, and wherein for each transfer for which the collective compression is performed, in a case where the plurality of pieces of the metadata include information indicating that compression is performed, the secondary storage system decompresses the collectively compressed data based on the compressed size indicated by each of the plurality of pieces of the metadata.

11. The remote copy system according to claim 1, wherein a reception size that is an upper limit of a data size that can be received by a compression function of the primary storage system is determined, the primary storage system divides the plurality of pieces of journal data by a division size equal to or smaller than the reception size, the compression function outputs a plurality of compressed data segments by compressing each of a plurality of data segments obtained by dividing the plurality of pieces of journal data by the division size, and the collectively compressed data is data configured by the plurality of compressed data segments.

12. The remote copy system according to claim 11, wherein the secondary storage system acquires the plurality of compressed data segments by dividing the collectively compressed data by a compressed size specified from each metadata of respective compressed data segment of the plurality of compressed data segments, and decompresses each of the plurality of compressed data segments.

13. The remote copy system according to claim 12, wherein the compression function is an accelerator of compression.

14. The remote copy system according to claim 13, wherein in a case where the secondary volume is associated with the primary volume as a pairing partner, formed copy is performed in which a content of the secondary volume matches a content of the primary volume, and in the formed copy, the accelerator compresses each data segment each time data is transferred from the primary storage system to the secondary storage system.

15. The remote copy system according to claim 1, wherein for each write request designating the primary volume, the primary storage system performs write processing including writing respective data accompanying the write request to the primary volume, storing respective journal data which is a copy of the respective data and storing respective metadata including a write order of the respective journal data, and wherein the primary storage system performs a completion response of the write request for each of the write request designating the primary volume without waiting for storage and collective compression of respective journal data of respective data accompanying the write request.

16. The remote copy system according to claim 1, wherein the secondary storage system transmits a journal read request to the primary storage system, wherein the transfer targets are transferred from the primary storage system to the secondary storage system in response to the journal read request, and wherein the secondary storage system decompresses the collectively compressed data based on the plurality of pieces of metadata in the transfer targets, and writes the decompressed collectively compressed data to the secondary volume.

17. A remote copy method performed by a primary storage system having a primary volume and a secondary storage system including a secondary volume configuring a volume pair with the primary volume, the method comprising:

associating journal data with metadata that includes a write order of the journal data, the journal data being a copy of data written in the primary volume;

performing, by the primary storage system, collective compression of data that i) is at least a part of a plurality of pieces of the journal data in a plurality of journals and ii) is larger than a size of one journal data, wherein i) collectively compressed data which is the data that has been collectively compressed and ii) a plurality of pieces of metadata corresponding to the collectively compressed data are transfer targets from the primary storage system to the secondary storage system; and acquiring, by the secondary storage system, a second plurality of pieces of journal data by decompressing one or more pieces of the collectively compressed data received from the primary storage system, and writing the second plurality of pieces of journal data to the secondary volume according to the write order represented by each of the plurality of pieces of the metadata that are received from the primary storage system.

* * * * *